(12) United States Patent
Cruz-Albrecht et al.

(10) Patent No.: US 11,501,143 B2
(45) Date of Patent: Nov. 15, 2022

(54) SCALABLE INTEGRATED CIRCUIT WITH SYNAPTIC ELECTRONICS AND CMOS INTEGRATED MEMRISTORS

(71) Applicant: HRL Laboratories, LLC, Malibu, CA (US)

(72) Inventors: Jose Cruz-Albrecht, Oak Park, CA (US); Timothy Derosier, Colorado Springs, CO (US); Narayan Srinivasa, Portland, OR (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 16/447,210

(22) Filed: Jun. 20, 2019

(65) Prior Publication Data

US 2019/0318232 A1 Oct. 17, 2019
US 2022/0121911 A9 Apr. 21, 2022

Related U.S. Application Data

(63) Continuation-in-part of application No. 14/453,154, filed on Aug. 6, 2014, now abandoned.
(Continued)

(51) Int. Cl.
*G06N 3/063* (2006.01)
*G06N 3/04* (2006.01)
*G06N 3/08* (2006.01)

(52) U.S. Cl.
CPC .............. *G06N 3/063* (2013.01); *G06N 3/04* (2013.01); *G06N 3/08* (2013.01)

(58) Field of Classification Search
CPC ............. G06N 3/063; G06N 3/04; G06N 3/08
(Continued)

(56) References Cited

U.S. PATENT DOCUMENTS 3,569,842 A 3/1971 Schroyer et al.
3,824,411 A 7/1974 Wharton
(Continued)

FOREIGN PATENT DOCUMENTS

CN 101771413 A 7/2010
CN 101971166 A 2/2011
CN 102567784 A 7/2012

OTHER PUBLICATIONS

Minkovich et al. "Programming Time-Multiplexed Reconfigurable Hardware Using a Scalable Neuromorphic Compiler", IEEE Transactions on Neural Network and Learning Systems, vol. 23, No. 6, pp. 889-901, Jun. 2012 (Year: 2012).*
(Continued)

*Primary Examiner* — Tsu-Chang Lee
(74) *Attorney, Agent, or Firm* — Ladas & Parry, LLP

(57) ABSTRACT

A reconfigurable neural circuit includes an array of processing nodes. Each processing node includes a single physical neuron circuit having only one input and an output, a single physical synapse circuit having a presynaptic input, and a single physical output coupled to the input of the neuron circuit, a weight memory for storing N synaptic conductance value or weights having an output coupled to the single physical synapse circuit, a single physical spike timing dependent plasticity (STDP) circuit having an output coupled to the weight memory, a first input coupled to the output of the neuron circuit, and a second input coupled to the presynaptic input, and interconnect circuitry connected to the presynaptic input and connected to the output of the single physical neuron circuit. The synapse circuit and the STDP circuit are each time multiplexed circuits. The interconnect circuitry in each respective processing node is coupled to the interconnect circuitry in each other processing node.

32 Claims, 19 Drawing Sheets

Related U.S. Application Data

(60) Provisional application No. 61/890,790, filed on Oct. 14, 2013, provisional application No. 61/890,166, filed on Oct. 11, 2013.

(58) Field of Classification Search
USPC .......................................................... 706/25
See application file for complete search history.

(56) References Cited

U.S. PATENT DOCUMENTS

| | | | |
|---|---|---|---|
| 5,387,882 A | 2/1995 | Schoofs | |
| 5,537,562 A * | 7/1996 | Gallup | G06N 3/063 712/234 |
| 5,650,739 A | 7/1997 | Hui et al. | |
| 5,907,250 A | 5/1999 | Baizley et al. | |
| 6,052,011 A | 4/2000 | Dasgupta | |
| 6,121,811 A | 9/2000 | Scott et al. | |
| 6,124,730 A * | 9/2000 | Agrawal | H03K 19/1737 326/38 |
| 6,124,746 A | 9/2000 | Van Zalinge | |
| 6,249,144 B1 | 6/2001 | Agrawal et al. | |
| 6,466,076 B2 | 10/2002 | Yoshikawa | |
| 6,581,046 B1 | 6/2003 | Ahissar | |
| 7,587,541 B2 | 9/2009 | Chen et al. | |
| 7,724,168 B1 | 5/2010 | Cruz-Albrecht et al. | |
| 7,750,835 B1 | 7/2010 | Cruz-Albrecht et al. | |
| 7,822,698 B1 | 10/2010 | Cruz-Albrecht et al. | |
| 8,510,244 B2 | 8/2013 | Carson et al. | |
| 8,595,157 B2 | 11/2013 | Cruz-Albrecht et al. | |
| 8,600,919 B2 | 12/2013 | Poon et al. | |
| 8,712,940 B2 | 4/2014 | Modha | |
| 8,812,414 B2 * | 8/2014 | Arthur | G06N 3/063 706/15 |
| 8,959,040 B1 | 2/2015 | Cruz-Albrecht et al. | |
| 8,975,935 B1 | 3/2015 | Yung et al. | |
| 8,977,578 B1 | 3/2015 | Cruz-Albrecht et al. | |
| 8,996,431 B2 | 3/2015 | Cruz-Albrecht et al. | |
| 9,697,462 B1 | 7/2017 | Cruz-Albrecht et al. | |
| 10,070,800 B2 | 9/2018 | Suri et al. | |
| 10,147,035 B2 | 12/2018 | Cruz-Albrecht et al. | |
| 2002/0027465 A1 | 3/2002 | Yoshikawa | |
| 2004/0217794 A1 | 11/2004 | Strysko | |
| 2005/0137993 A1 | 6/2005 | Poon et al. | |
| 2007/0092958 A1 | 4/2007 | Naweed et al. | |
| 2010/0076916 A1 | 3/2010 | Van der Made | |
| 2010/0109626 A1 | 5/2010 | Chen | |
| 2011/0004579 A1 | 1/2011 | Snider | |
| 2012/0011089 A1 | 1/2012 | Aparin et al. | |
| 2012/0011092 A1 | 1/2012 | Tang et al. | |
| 2012/0036099 A1 | 2/2012 | Venkatraman et al. | |
| 2012/0110891 A1 | 5/2012 | Minnameier | |
| 2012/0150781 A1 | 6/2012 | Arthur et al. | |
| 2013/0031040 A1 * | 1/2013 | Modha | G06N 3/049 706/27 |
| 2013/0073500 A1 | 3/2013 | Szatmary et al. | |
| 2013/0117213 A1 | 5/2013 | Hunzinger et al. | |
| 2014/0032460 A1 | 1/2014 | Cruz-Albrecht et al. | |
| 2014/0032465 A1 | 1/2014 | Modha | |
| 2014/0250037 A1 | 9/2014 | Lzhikevich et al. | |
| 2015/0220831 A1 | 8/2015 | Hunzinger et al. | |
| 2015/0278682 A1 | 10/2015 | Saxena | |
| 2016/0224889 A1 * | 8/2016 | Alvarez Icaza Rivera | H04W 64/00 |
| 2016/0364643 A1 | 12/2016 | Cruz-Albrecht et al. | |

OTHER PUBLICATIONS

Cruz-Albrecht et al., "Energy-Efficient Neuron, Synapse and STDP Integrated Circuits", IEEE Transactions on Biomedical Circuits and Systems, vol. 6, No. 3, pp. 249-256, Jun. 2012 (Year: 2012).*
Zamarreno-Ramos, et al., "Multicasting Mesh AER: A Scalable Assembly Approach for Reconfigurable Neuromorphic Structured AER Systems. Application to ConvNets", IEEE Transactions on Biomedical circuits and systems,, vol. 7, No. 1, Feb. 2013 (Year: 2013).*
International Search Report from PCT/CN2020/037891, dated Sep. 25, 2020.
Written Opinion from the International Searching Authority International Search Report from PCT/CN2020/037891, dated Sep. 25, 2020.
Minkovich et al., "Programming Time-Multiplexed Reconfigurable Hardware Using a Scalable Neuromorphic Compiler", IEEE Transactions on Neural Networks and Learning Systems, vol. 23, No. 6, Jun. 2012.
Cruz-Albrecht et al., "Energy-Efficient Neuron, Synapse and STDP Integrated Circuits", IEEE Transactions on Biomedical Circuits and Systems, vol. 6, No. 3, Jun. 2012.
International Preliminary Report on Patentability from PCT/US2020/037891, dated May 27, 2021.
Office Action from U.S. Appl. No. 13/145,812, dated Jun. 24, 2014.
Koickal, T.J. et al. "Bio-inspired event coded configurable analog circuit block." Evolvable Systems: From Biology to Hardware. LNCS vol. 5216. Springer Berlin Heidelberg, 2008, pp. 285-295.
Koickal, T.J. et al. Analog VLSI Circuit Implementation of an Adaptive Neuromorphic Olfaction Chip, IEEE Trans. Circuit Systems I: Reg. Papers, vol. 54, No. 1, pp. 60-73, Jan. 2007.
Notice of Allowance from U.S. Appl. No. 13/145,812, dated Oct. 7, 2014.
Office Action from U.S. Appl. No. 13/535,114, dated Jul. 28, 2014.
Notice of Allowance from U.S. Appl. No. 13/535,114, dated Nov. 3, 2014.
Office Action from U.S. Appl. No. 14/588,929, dated Feb. 2, 2016.
Autere and Lehtinen, "Robot motion planning by a hierarchical search on a modified discretized configuration space," 1997, entire document.
Office Action from U.S. Appl. No. 14/588,929, dated Oct. 20, 2016.
Notice of Allowance from U.S. Appl. No. 14/588,929, dated Mar. 3, 2017.
Chiara Bartolozzi, Giacomo Indiveri, "Silicon Synaptic Homeostasis," Brain Inspired Cognitive Systems, pp. 1-6, (Oct. 2014).
John Lazzaro, "Low-Power Silicon Spiking Neurons and Axons." IEEE Symposium on Circuits and Systems, pp. 2220-2223, (1992).
J. Cruz, L.o. Chua, "A 16×16 Cellular Neural Network Chip: The First Complete Single-Chip Dynamic Computer Array with Distributed Memory with Gray-Scale Input-Output," Analog Integrated Circuits and Signal Processing vol. 15, No. 3, pp. 227-237, (Mar. 1998).
Kuk-Hwan Kim, Siddharth Gaba, Dana Wheeler, Jose M. Cruz-Albrecht, Tahir Hussain, Narayan Srinivassa and Wei Lu, "A Functional Hybrid Memristor Crossbar-Array/CMOS Systems for Data Storage and Neuromorphic Applications," Nano Letters, vol. 12, Issue No. 1, pp. 389-395, (Jan. 2012).
Jo S.H., Change T, Ebong, I, Bhadviya B B, Mazumder P, and Lu W, "Nanoscale Memristor Device as Synapse in Neuromorphic Systems," Nanoletters, pp. 1297-1301, (Mar. 2010).
Jose M. Cruz-Albrecht, Timothy Derosier and Narayan Srinivasa, "A Scalable Neural Chip with Synaptic Electronics using CMOS Integrated Memristors," Nanotechnology, pp. 1-11, (Sep. 2013).
International Search Report and Written Opinion for PCT/US2012/065640, dated Mar. 28, 2013.
International Preliminary Report on Patentability for PCT/US2012/065640, dated Jan. 27, 2015.
From U.S. Appl. No. 13/679,727 (now U.S. Publication No. US 2014-0032460 Al), Notice of Allowance dated Nov. 20, 2014.
From U.S. Appl. No. 13/931,024 (now U.S. Pat. No. 8,975,935}, Notice of Allowance dated Dec. 15, 2014.
Izhikevich, E.M. et al., "Large-scale model of mammalian thalamocortical systems (Supporting Information Appendix}", Proceedings National Academy of Sciences (PNAS}, vo. 105, No. 9, pp. 3593-3598, 2008.
Chinese Office Action from Chinese Patent Application No. 201280073534.6 dated Nov. 3, 2015, with brief English translation.
Office Actions and Notices of Allowance from U.S. Appl. No. 15/199,800, dated Nov. 29, 2017, Jan. 30, 2018, Jul. 18, 2018, and Aug. 6, 2018.

(56) References Cited

OTHER PUBLICATIONS

Bofilli-Petit et al.: "Synchrony Detection and Amplification by Silicon Neurons With STDP Synapses". IEEE Transactions on Neural Networks. vol. 15, Sep. 1, 2004. pp. 1296-1304.
From EPO Application No. 12881688.1, EPO Supplementary Search Report with Search Opinion dated Apr. 26, 2017.
From PCT/US2017/035323, PCT International Search Report and Written Opinion dated Sep. 7, 2017.
Noack, "Switched-capacitor realization of presynaptic short-term plasticity and stoplearning synapses in 28nm CMOS", Frontiers in Neuroscience, vol. 9, Article 10, Feb. 2015, pp. 1-14.
From U.S. Appl. No. 14/453,154 Application Office Action dated Jan. 25, 2017.
From U.S. Appl. No. 14/453,154 Application Office Action dated Jul. 11, 2017.
From U.S. Appl. No. 14/453,154 Application Office Action dated Oct. 3, 2017.
From U.S. Appl. No. 14/453,154 Application Office Action dated Mar. 25, 2019.
From U.S. Appl. No. 13/679,727 Notice of Allowance dated Nov. 20, 2014.

* cited by examiner

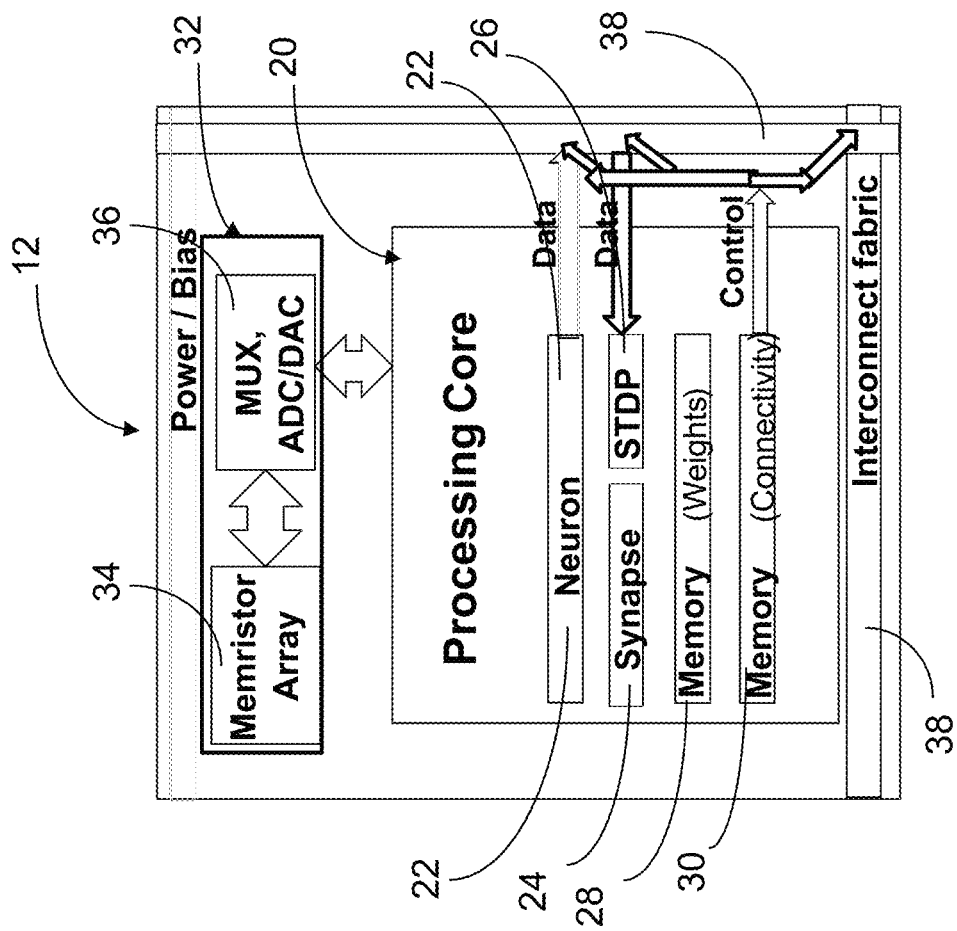
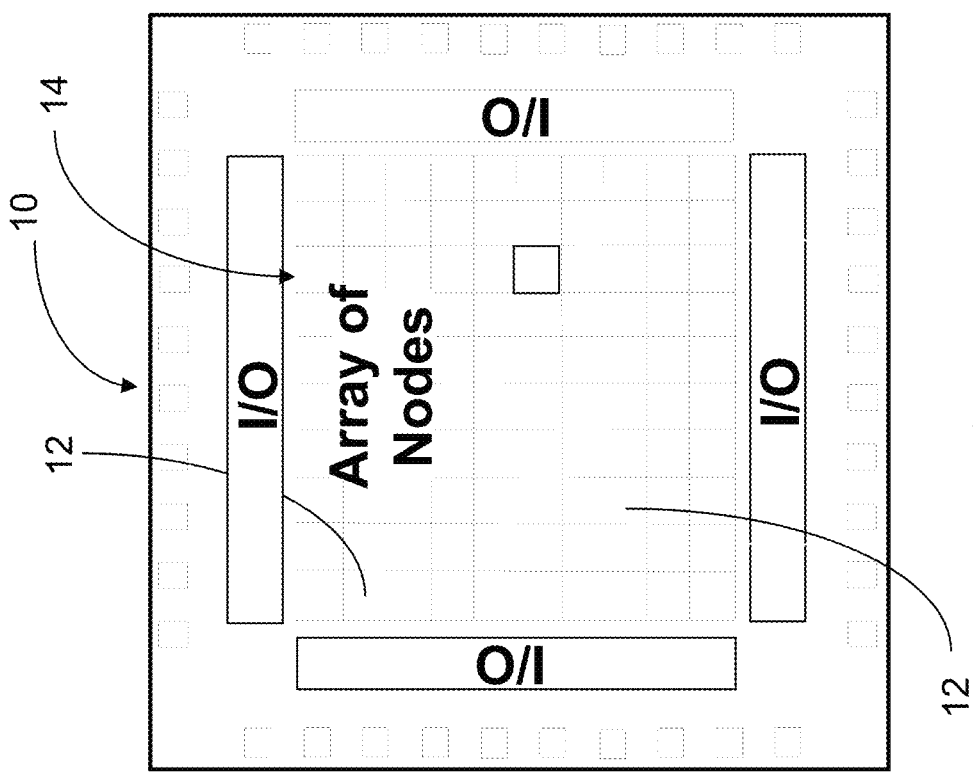
FIG. 1B
FIG. 1A

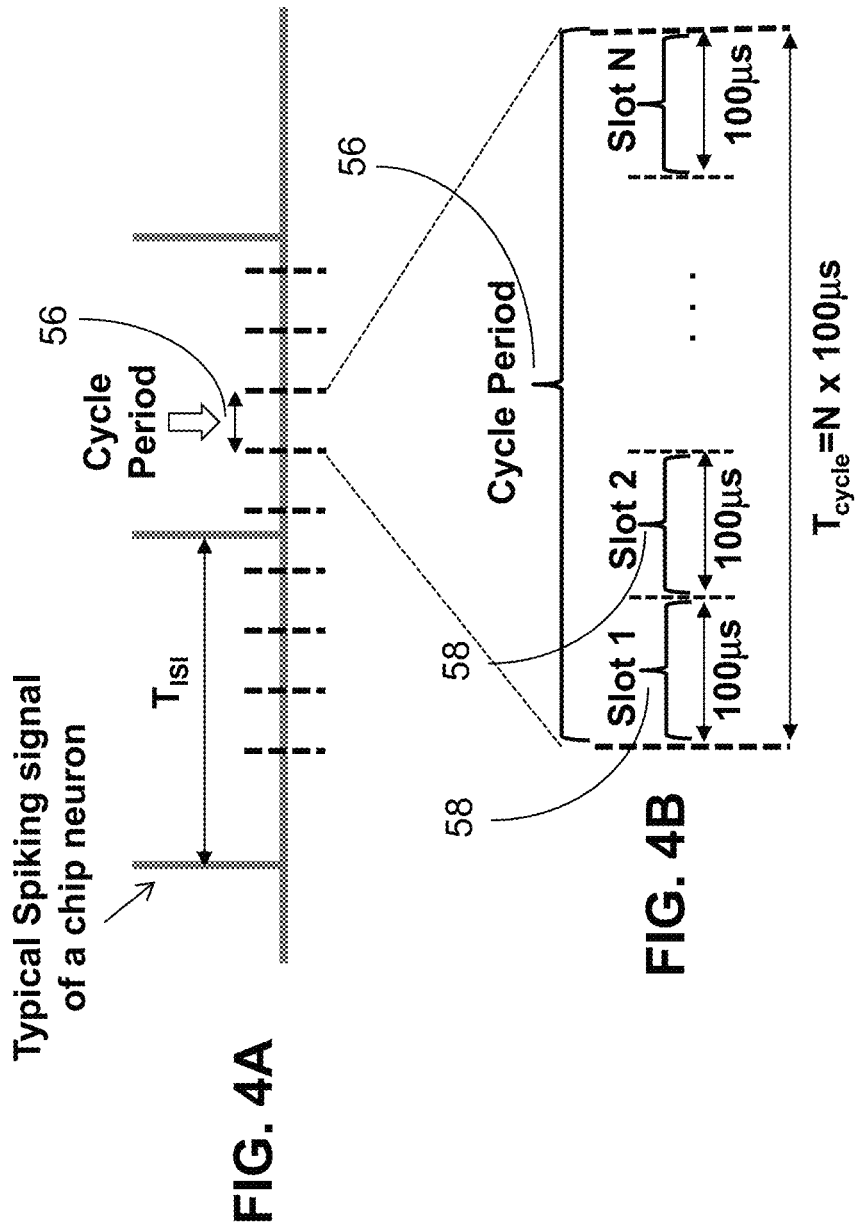

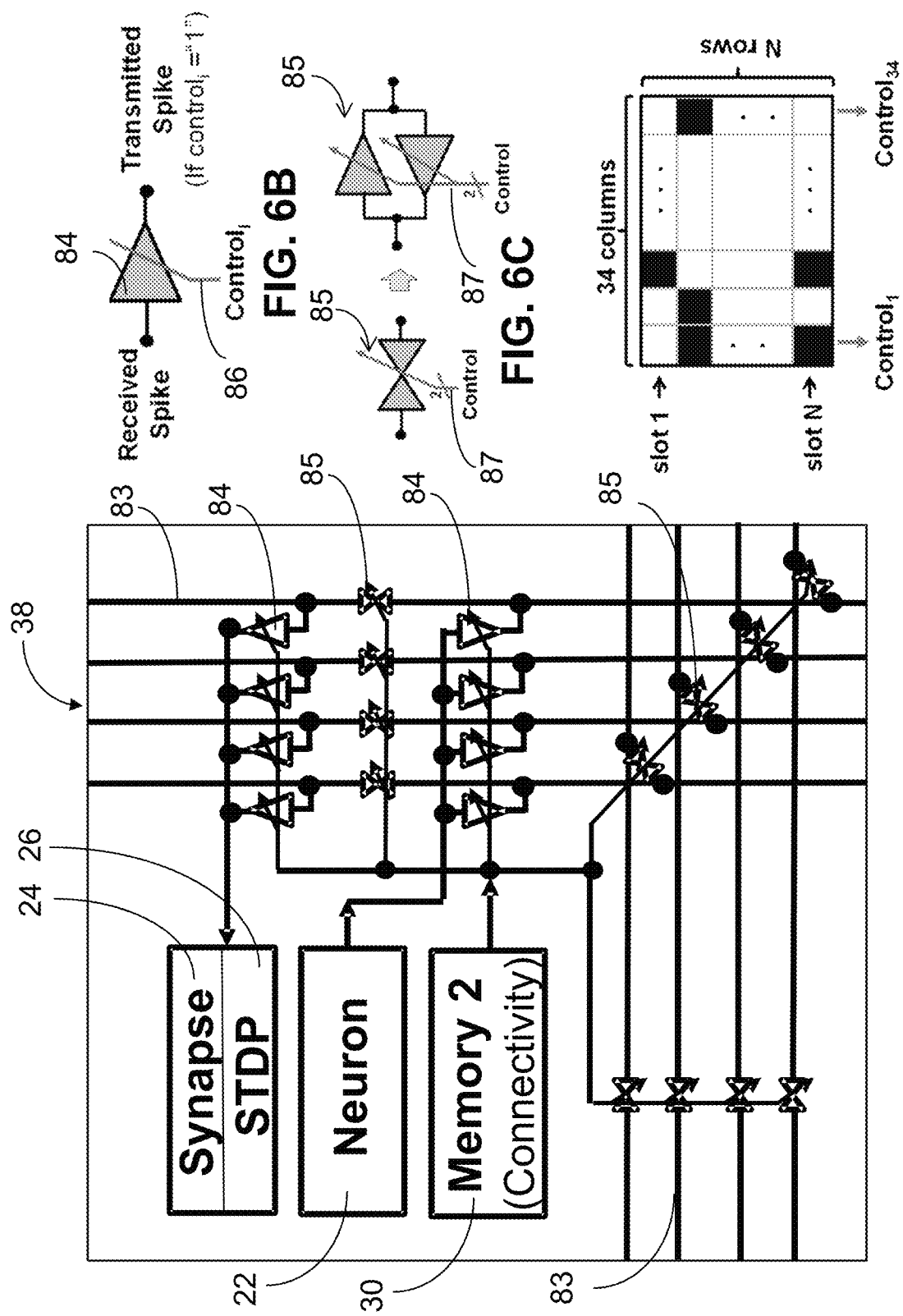

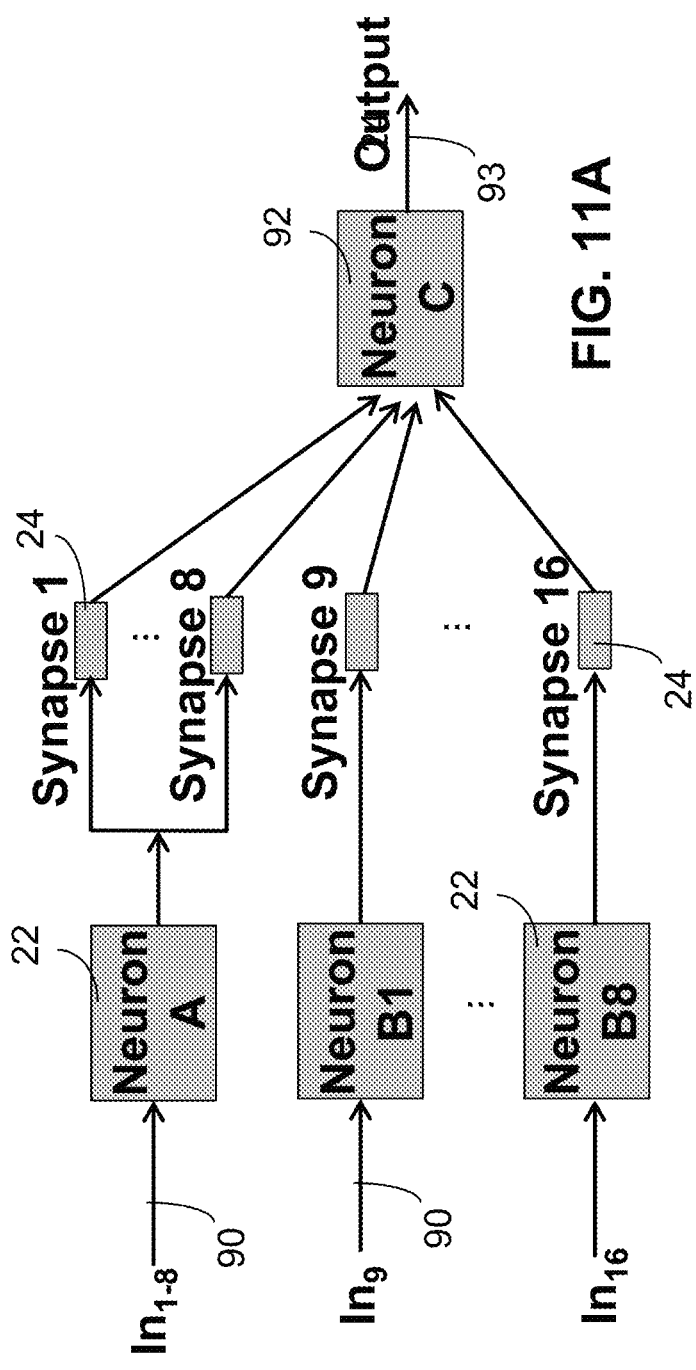
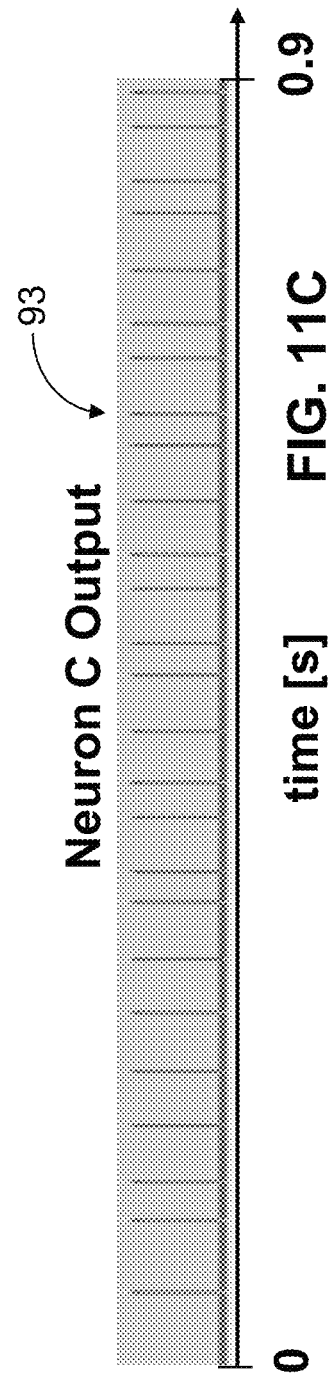

SCALABLE INTEGRATED CIRCUIT WITH SYNAPTIC ELECTRONICS AND CMOS INTEGRATED MEMRISTORS

CROSS REFERENCE TO RELATED APPLICATIONS

This application is a continuation in part of U.S. patent application Ser. No. 14/453,154, filed Aug. 6, 2014 and is related to and claims priority from U.S. Provisional Application Ser. No. 61/890,166, filed Oct. 11, 2013, and U.S. Provisional Application Ser. No. 61/890,790, filed Oct. 14, 2013, which are incorporated herein as though set forth in full. This application is also related to U.S. application Ser. No. 13/415,812, filed Mar. 8, 2012, U.S. application Ser. No. 13/535,114, filed Jun. 27, 2012, and U.S. patent application Ser. No. 13/679,727, filed Nov. 16, 2012 which are incorporated herein as though set forth in full.

STATEMENT REGARDING FEDERAL FUNDING

This invention was made under U.S. Government contract HR0011-09-C-0001. The U.S. Government has certain rights in this invention.

TECHNICAL FIELD

This disclosure relates to neural networks.

BACKGROUND

An example neural circuit is given in prior art reference [1], listed below. However in reference [1] the neuron is not spiking and there is no spike timing dependent plasticity (STDP). Furthermore the neurons can only communicate locally.

In prior art reference [2], listed below, spiking neurons and synapses with STDP are shown. However these circuits are not connected to each other and reference [2] does not have any interconnect fabric. In prior art reference [3], listed below, a memristor array integrated with CMOS is shown. However no neural circuits, synapses, STDP or interconnect fabric are used in reference [3].

Neural circuits composed of neurons and synapses based on memristors are described in prior art reference [4], listed below. However, in this circuit the connections are not programmable. Furthermore in reference [4] the neurons are only located in the periphery of a synaptic array, so the number of neurons scales linearly with a horizontal or vertical dimension of an integrated circuit.

REFERENCES

[1] J. Cruz et al. "A 16×16 Cellular Neural Network Chip: The first Complete Single-Chip Dynamic Computer Array with Distributed Memory and with Gray-Scale Input-Output," Analog Integrated Circuits and Signal Processing, vol. 15, no. 3, pp. 227-238, March 1998

[2] J. M. Cruz-Albrecht, M. Yung, and N. Srinivasa, "Energy-efficient neuron, synapse and STDP integrated circuits", IEEE Trans. Biomed. Circuits Syst., vo. 6, no. 3, pp. 246-256, June 2012.

[3] Kuk-Hwan Kim, Siddharth Gaba, Dana Wheeler, Jose M. Cruz-Albrecht, Tahir Hussain, Narayan Srinivasa, and Wei Lu, entitled "A Functional Hybrid Memristor Cross-bar-Array/CMOS System for Data Storage and Neuromorphic Applications," Nano Letters, Vol. 12, issue no. 1, pp. 389-395, Jan. 11, 2012.

[4] Jo S H, Chang T, Ebong I, Bhadviya B B, Mazumder P, and Lu W "Nanoscale Memristor Device as Synapse in Neuromorphic Systems" NanoLetters 10 1297-1301, 2010.

[5] Minkovich et al. "Programming Time-Multiplexed Reconfigurable Hardware Using a Scalable Neuromorphic Compiler", IEEE Transactions on Neural Network and Learning Systems, Vol. 23, No. 6, pages 889-901 (June 2012), in 20 Feb. 2015 IDS, NPL, No. 29.

What is needed is an improved neural network with neural circuits, synapse circuits and spike timing dependent plasticity circuits. The embodiments of the present disclosure answer these and other needs.

SUMMARY

In a first embodiment disclosed herein, an array comprises a plurality of processing nodes, wherein each processing node comprises a single physical neuron circuit, the single physical neuron circuit having only one input and having an output, a single physical synapse circuit, the single physical synapse circuit having a presynaptic input, and the single physical synapse circuit having a single physical output coupled to the only one input of the single physical neuron circuit, a weight memory for storing N synaptic conductance value or weights, the weight memory having an output coupled to the single physical synapse circuit, wherein N is an integer greater than 1, a single physical spike timing dependent plasticity (STDP) circuit, the single physical STDP circuit having an output coupled to an input of the weight memory, a first input coupled to the output of the single physical neuron circuit, and a second input coupled to the presynaptic input, and interconnect circuitry connected to the presynaptic input and connected to the output of the single physical neuron circuit, wherein the only one input of the single physical neuron circuit is only connected to the output of the single physical synapse circuit, wherein the single physical synapse circuit is time multiplexed to implement N virtual synapse circuits, and wherein the single physical STDP circuit is time multiplexed to implement N virtual STDP circuits, and wherein the interconnect circuitry in each respective processing node in the array is coupled to the interconnect circuitry in each other processing node in the array.

In another embodiment disclosed herein, a method of providing an array comprises a plurality of processing nodes, wherein each processing node comprises a single physical neuron circuit, the single physical neuron circuit having only one input and having an output, a single physical synapse circuit, the single physical synapse circuit having a presynaptic input, and the single physical synapse circuit having a single physical output coupled to the only one input of the single physical neuron circuit, a weight memory for storing N synaptic conductance value or weights, the weight memory having an output coupled to the single physical synapse circuit, wherein N is an integer greater than 1, a single physical spike timing dependent plasticity (STDP) circuit, the single physical STDP circuit having an output coupled to an input of the weight memory, a first input coupled to the output of the single physical neuron circuit, and a second input coupled to the presynaptic input, and interconnect circuitry connected to the presynaptic input and connected to the output of the single physical neuron circuit, wherein the only one input of the single physical neuron circuit is only connected to the output of the single physical synapse circuit, wherein the single physical synapse circuit is time multiplexed to implement N virtual synapse circuits, and wherein the single physical STDP circuit is time multiplexed to implement N virtual STDP circuits, and wherein the interconnect circuitry in each respective processing node in the array is coupled to the interconnect circuitry in each other processing node in the array.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 1A shows a diagram of a reconfigurable neural network having an array of processing nodes, and FIG. 1B shows a diagram of a processing node with a processing core, a memristor memory and an interconnect fabric in accordance with the present disclosure;

FIGS. 4A and 4B show timing diagrams for time multiplexing in accordance with the present disclosure;

FIG. 6A shows the interconnect fabric of one processing node, FIG. 6B shows a switch with on/off control, FIG. 6C shows a bi-directional switch with control, and FIG. 6D shows a detail of memory to store the connectivity controls in accordance with the present disclosure;

FIG. 11A shows a neural network with 10 neurons and 16 synapses, FIG. 11C shows a simulation of the output neuron C in FIG. 11A.

DETAILED DESCRIPTION

Figure 2A:
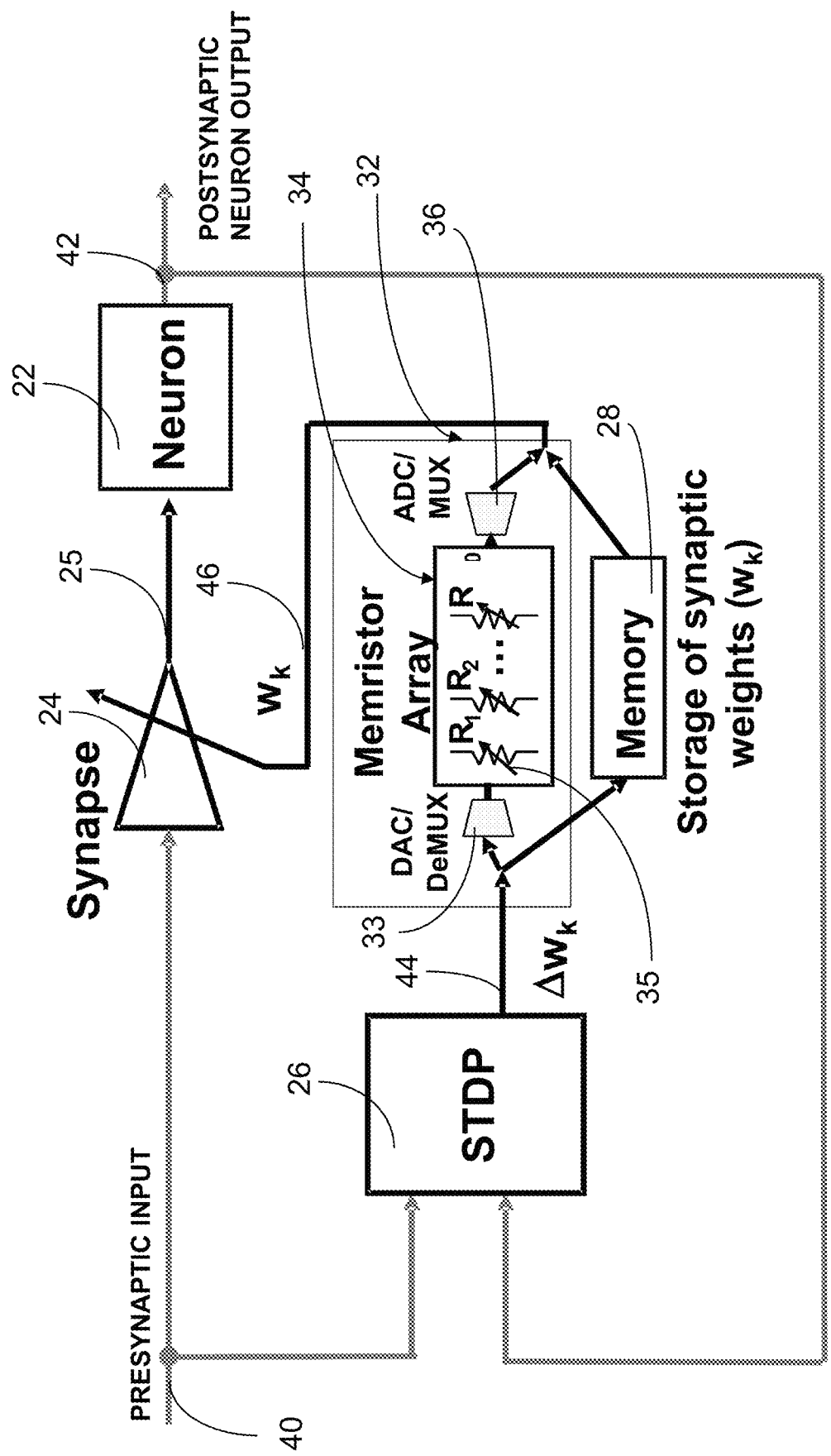
FIG. 2A shows components of a processing core of a node and shows the interaction between a neuron circuit, a synapse circuit, an spike timing dependent plasticity (STDP) circuit and a weight memory in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

In this disclosure a scalable neuromorphic integrated circuit is described with spiking neurons, synapses, and spike timing dependent plasticity (STDP), in which the connections between the neurons and synapses are not fixed but can be programmed. The synapses, STDP circuits and the interconnect routing between the neurons and synapses are time multiplexed. The integrated circuit includes memories to store both synaptic weights and interconnect routing information. The circuit includes memristor memories to achieve high density, and CMOS circuitry to write and read memristors.

The structure of each node in an array is composed of a neuron circuit, a time multiplexed synapse circuit, a time multiplexed STDP circuit, a weight memories, a time multiplexed programmable interconnect fabric, and a connectivity memory for controlling the interconnect fabric.

An object of the present disclosure is a reconfigurable integrated circuit with an array of nodes that can implement the dynamics of spiking neural circuits and synapses with spiking timing dependent plasticity. An advantage of the integrated circuit of the present disclosure is the ability to scale to high density while having the flexibility to be able to implement different neural networks with different topologies.

FIG. 1A shows a top level diagram of a reconfigurable neural circuit 10 having an array 14 of processing nodes 12. The array 14 is a two dimensional array, and may be a square array. In FIG. 1A an example array 14 of 10×10 processing nodes 12 is shown. Larger arrays may be built, and an integrated circuit with an array of 24×24 nodes has been implemented using 90 nm CMOS technology.

The processing nodes 12 are arranged as a two dimensional array 14. This arrangement allows the number of nodes 12 to scale with the area of the integrated circuit. As the length of the horizontal or vertical side of the integrated circuit increases the number of nodes 12 increases by the square of the length.

In FIG. 1B, a diagram of a processing node 12 is shown. The processing node 12 has a processing core 20 with a single physical neuron circuit 22, which may be an integrate and fire neuron circuit, a single physical synapse circuit 24, a single physical STDP (spike timing dependent plasticity) element 26, a memory 28 to store synaptic weights, and a memory 30 to store interconnect routing connectivity. The memories 28 and 30 may be CMOS. The STDP element 26 is an adaption element or circuit that adjusts the weight or gain of the synapse 24 according to a biologically inspired spike timing dependent plasticity (STDP) learning rule.

The processing node 12 may include a memristor memory 32. As shown in FIG. 2, the memristor memory 32 has a memristor array 34 of memristors 35, DAC/DeMUX (digital to analog converter/demultiplexer) circuitry 33, and ADC/MUX (analog to digital converter/multiplexer) circuitry 36. The memristor memory 32 may be used to store synaptic weights. In one example embodiment there may be 128 memristors per node. As shown in FIG. 2, memory 28 in the processing core 20 may also store synaptic weights.

The processing node 12 also includes interconnect circuitry or fabric 38, shown in FIGS. 1B and 6A, that is used to enable communication between processing nodes 12. The interconnect circuitry 38 in each processing node is coupled to the presynaptic input 40 in each other processing node 12 and coupled to the output 42 of the single physical neuron circuit 22 in each other processing node 12. The interconnect fabric 38 may also be used to provide the connections between the neuron circuit 22, the synapse circuit 24, and the STDP circuit 26 in each processing node, as shown in FIG. 6A.

The interconnect fabric 38 is composed of wire segments 83 and switches 84 and 85, which are shown in FIG. 6A. As shown in FIG. 6A, the switches 84 of the interconnect fabric 38 may provide the connections between the neuron circuit 22, the synapse circuit 24, and the STDP circuit 26 in a processing node.

The switches 84 and 85 are controlled by connectivity settings stored in memory 30 of the processing core 20.

The array of nodes 12 in the reconfigurable neural circuit 10 is modular, and each node 12 may be directly abutted to its neighboring nodes 12. All the processing nodes 12 have the same processing core 20, the same memristor memory 32, and the same interconnect fabric 38. However, the operation of each node 12 may be programmed independently. Each node 12 may be programmed to support communication between nodes 12 that are both near and far away in the node array 14.

FIG. 2A shows a diagram showing the interaction between the neuron circuit 22, which may be an integrate and fire neuron circuit, the synapse circuit 24, the STDP circuit 26, and the memristor memory 32 or the memory 28. There is one neuron circuit 22 per node 12, one synapse circuit per node, one STDP circuit per node, and a memristor memory 32 or a memory 28. Shown in FIG. 3 is an integrate-and-fire type neuron circuit 22, which integrates the input 25, shown in FIG. 2, in an internal accumulator 48. When the integrated value reaches a threshold set by the value of the addressed memristor 35, then the neuron 22 resets the accumulator 48 back to zero and produces an output spike.

The processing core 20 of each node 12 has only a single physical neuron circuit 22, a single physical synapse circuit 24 and a single physical STDP circuit 26. The single physical synapse circuit 24 has a single physical output 25 connected to the input of the single physical neuron circuit 22. As shown in FIG. 2A, the single physical neuron circuit 22 in the node has only one physical input 25 that is connected only to the single physical synapse circuit 24 in the node.

The single physical synapse circuit 24 may be implemented in a number of ways and one way is the synapse circuit shown in FIG. 3b of Reference [2] above, which is incorporated herein by reference, and which shows that the synapse has a presynaptic input and a weight w. The boundary of the single physical synapse circuit 24 is the same as the portion of the synapse inside the circle of FIG. 3b with a Vpre input and $i_s$ output and a w weight, and the synapse core shown in FIGS. 5a and 5b. The synapse of FIG. 3b is not time shared. In the present disclosure, the single physical synapse circuit 24 is time multiplexed to implement N virtual synapse circuits, which reduces the amount of needed circuitry, which may be CMOS circuitry. Having a single physical synapse circuit 24 in a node 12 also reduces the number of needed interconnections in the node 12. The single physical STDP circuit 26 in the node 12 may be implemented in a number of ways and one way is the STDP circuit shown in FIG. 5b of Reference [2] above. The boundary of the single physical synapse circuit 24 is the same as the portion of FIGS. 5a and 5b that shows the STDP circuit with Vpre and Vpost inputs and a w output to the synapse core. The synapse 24 is time multiplexed as weights are read from the memristor memory 32 or the memory 28 to implement N virtual synapses. Thus, output 42 of the neuron 22 changes at each time interval, so the inputs to the STDP circuit also change each time interval so that the one physical STDP circuit is time multiplexed to implement N virtual STDPs, which reduces the amount of needed circuitry and also reduces the number of needed interconnections in the node 12. The memory for storing synaptic weights stores N synaptic weights, the same number as the number N of virtual synapse circuits and virtual STDP circuits. The synaptic weights to implement N virtual synapse circuits may be stored in the memristor memory 32 or in memory 28. In one example embodiment N may be 128.

With continued reference to FIG. 2A, the single physical STDP circuit 26 has two inputs, one input is presynaptic input 40 and a second input is fed back from the postsynaptic output 42 of the single physical neuron circuit 22. The STDP circuit 26 output 44 is used to access a synaptic weight 46 from the memristor memory 32 or from memory 28. The synaptic weight 46 is connected to the single physical synapse circuitry 24, as shown in FIG. 2A.

Figure 2B:
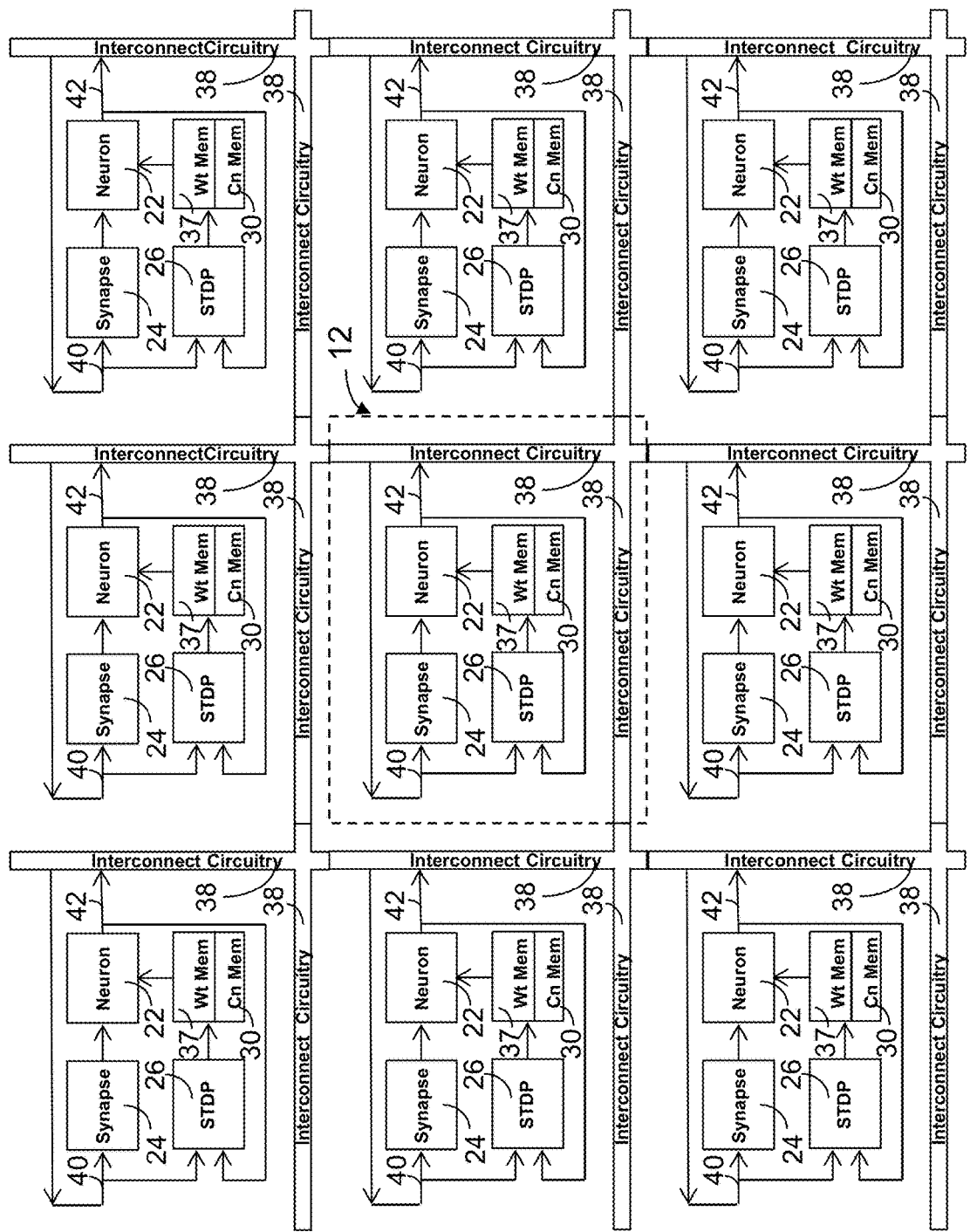
FIG. 2B shows an example array of processing nodes and shows that each processing node has a single physical neuron circuit, a single physical synapse circuit, a single physical STDP circuit, a weight memory, a connectivity memory and interconnect circuitry in accordance with the present disclosure.
Figure 3:
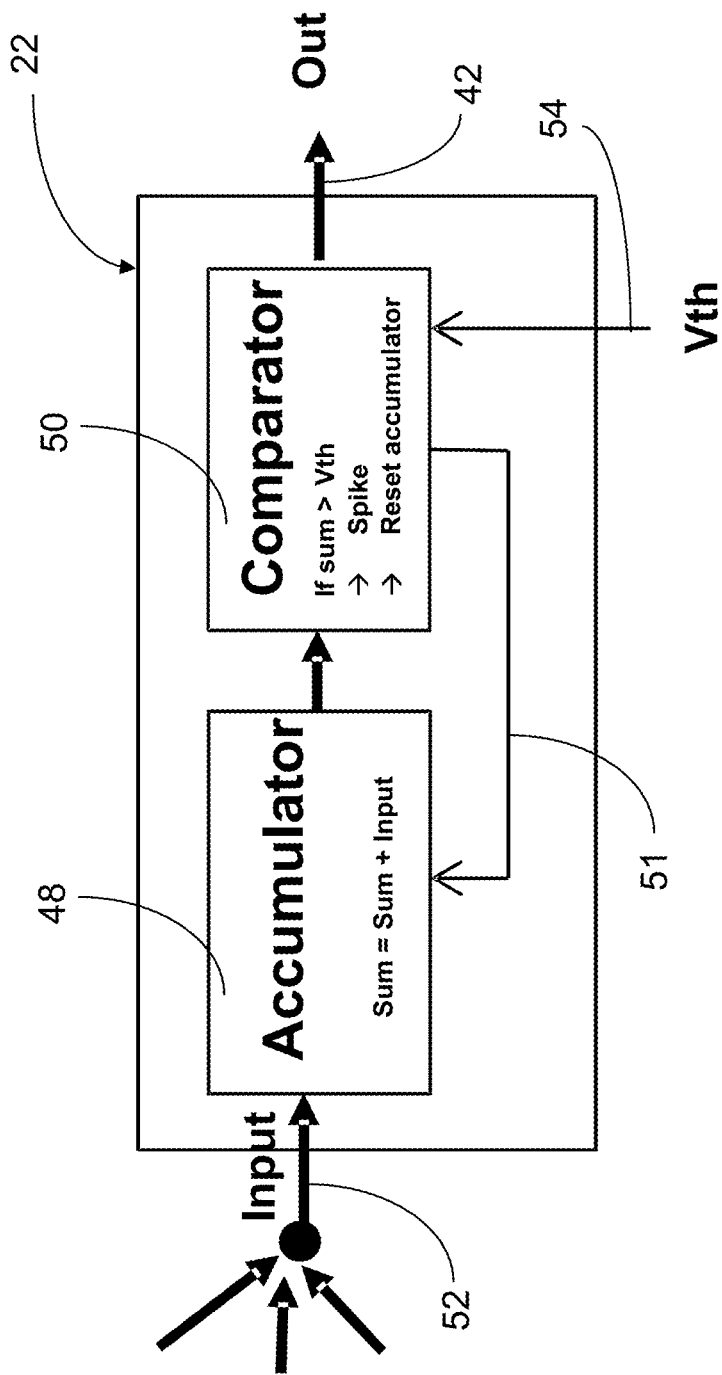
FIG. 3 shows one embodiment of a neuron in accordance with the present disclosure.

FIG. 2B shows an example array of processing nodes 12 having a two dimensional array of nine processing nodes 12 arranged in a 3×3 array. The size of the array and the number of processing nodes in an array may be any size and number. FIG. 2B shows that each processing node 12 has a single physical neuron circuit 22, a single physical synapse circuit 24, a single physical STDP circuit 26, a weight memory 37, a connectivity memory 30 and interconnect circuitry 38. The weight memory 37 may be the memristor memory 32 or memory 28. The interconnect circuitry 38 in a node 12 is connected to the interconnect circuitry in all the other nodes 12, as shown in FIG. 2B.

FIG. 3 shows an embodiment of a neuron circuit 22 in the processing core 20. In this embodiment the neuron circuit 22 is a digital circuit. The input 52 shown in FIG. 2 shows multiple virtual synapse inputs to the neuron from the single physical synapse circuit 24. Each virtual synapse input is digital and the output of the accumulator 48 is a count. When the count of the accumulator 48 reaches the threshold value the comparator 50 outputs a spike on line 51 and resets the accumulator 48. In one embodiment the spike may be a 1-bit digital signal. The accumulator 48 integrates the input 52, which may be the output of one or more virtual synapse circuits 24, that can be implemented by the time multiplexed single physical synapse circuit 24, whose single physical output 25 is connected to the single physical neuron circuit 22, as shown in FIGS. 2A and 2B. The comparator 50 compares the accumulator 48 state to a threshold voltage, Vth 54, which may be digital. If the accumulator 48 state is more than Vth 54, the comparator 50 produces an output spike, and resets the accumulator 48 state. For example, the accumulator 48 state may be reset to a count corresponding to 0 volts. The accumulator 48 may be a 9 bit accumulator.

Other neuron circuits may also be used in the processing core. Another neuron implementation that may be used is shown in FIG. 6A in U.S. patent application Ser. No. 13/679,727, filed Nov. 16, 2012, which is incorporated herein as though set forth in full.

FIGS. 4A and 4B show timing diagrams for synaptic time multiplexing. This synaptic time multiplexing (STM) may be performed by dividing the time consumed in a given STM cycle 56, which is the time required to cycle through N virtual synapse circuits and N virtual STDP circuits, into time slots 58, which may, in one example, be 100 μs duration each for a total cycle time of up to N*100 μs duration.

In one embodiment during each 100 μs time slot 58 the synapse circuit 24 is assigned to do the function of one given virtual synapse and one virtual STDP. In one example, N may be 128, so during a 12.8 ms cycle, which corresponds to 128 time slots 58, the synapse 24 may implement 128 different virtual synapses and STDPs. Time multiplexing requires the storage of one synaptic conductance per virtual synapse. For example, this storage may be provided by a memristor array 34 of 128 memristors 35. In each time slot one memristor 35 is read to access a synaptic conductance for a synapse. In addition in each time slot 58 the stored synaptic weight value in each memristor 35 in the memristor array 34 may be updated according to an update value provided by the STDP circuit 26. The update value is used to increment or decrement the currently stored synaptic conductance value in the memristor 35 for the virtual synapse. The memristors 35 may be accessed in a fixed order. During a time slot 58 of an STM cycle 56, the respective memristor 35 corresponding to a virtual synapse may be accessed once for reading and, if needed, once for writing to increment or decrement the currently stored synaptic conductance value by the update value.

The synaptic weights or conductance values may be stored with 3 bits of accuracy in either memory 28 or memristor memory 32. In one embodiment the memory 28 may be made of CMOS flip-flops, a SRAM (static random access memory), or any other type of digital memory.

Figure 5A:
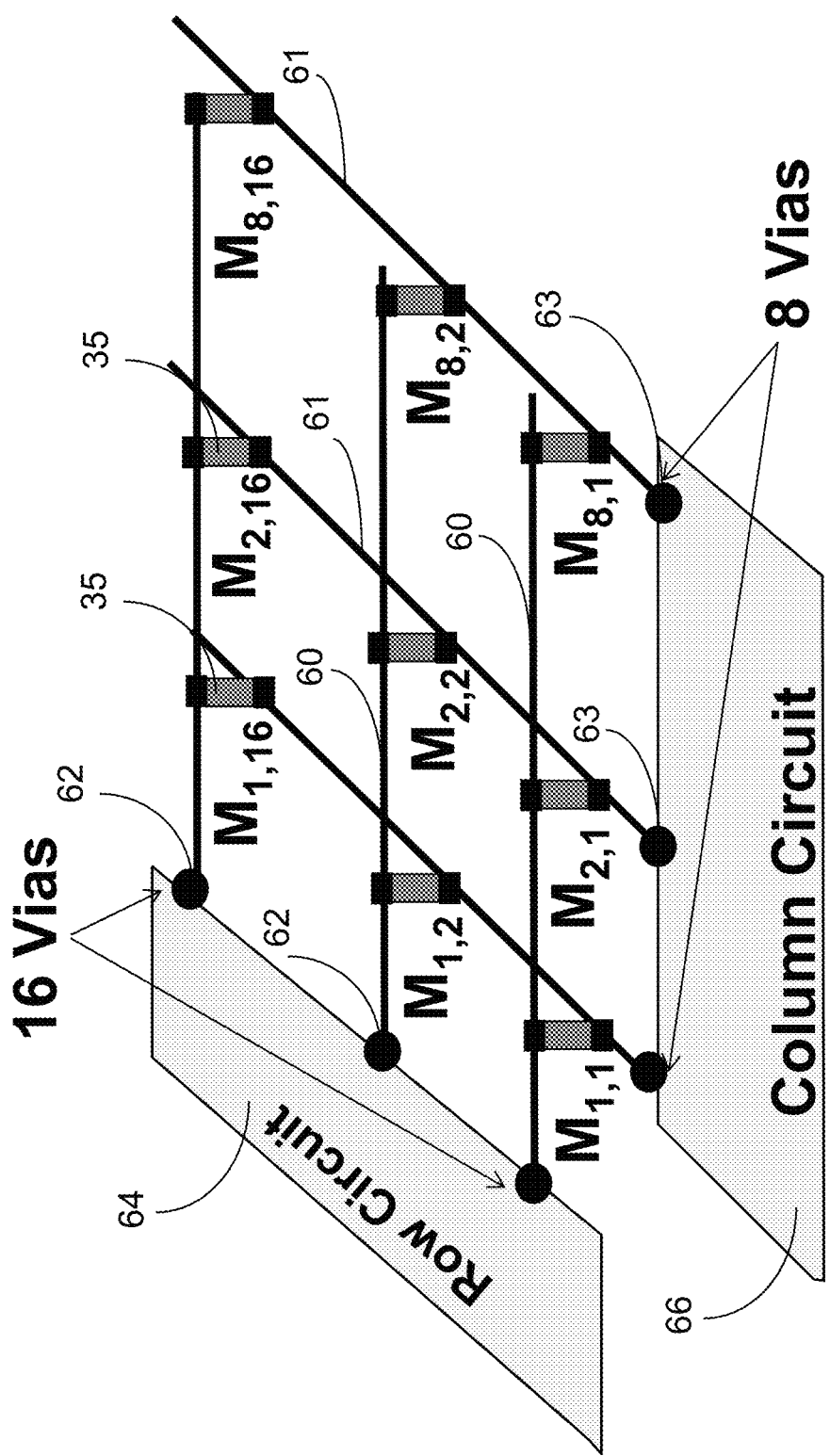
FIG. 5A shows a diagram of a memristor array inside one processing node with row and column access circuits.

The memristor array 34 of each node 12 interfaces to circuitry, which may be CMOS, to select a memristor 35 for a read or write operation. A symbolic diagram of the memristor array 34 is shown in FIG. 5A, and shows 128 memristors 35 with nanowires 60 and 61 arranged in 16 rows and 8 columns, respectively. In this embodiment there are 16 row vias 62 and 8 column vias 63 to interface the nanowires 60 and 61 to a row circuit 64 and a column circuit 66, respectively. The row circuit 64 and the column circuit 66 are used to select at any one time slot 58 one memristor 35 of the memristor array 34 to perform either a read or a write operation.

Figure 5B:
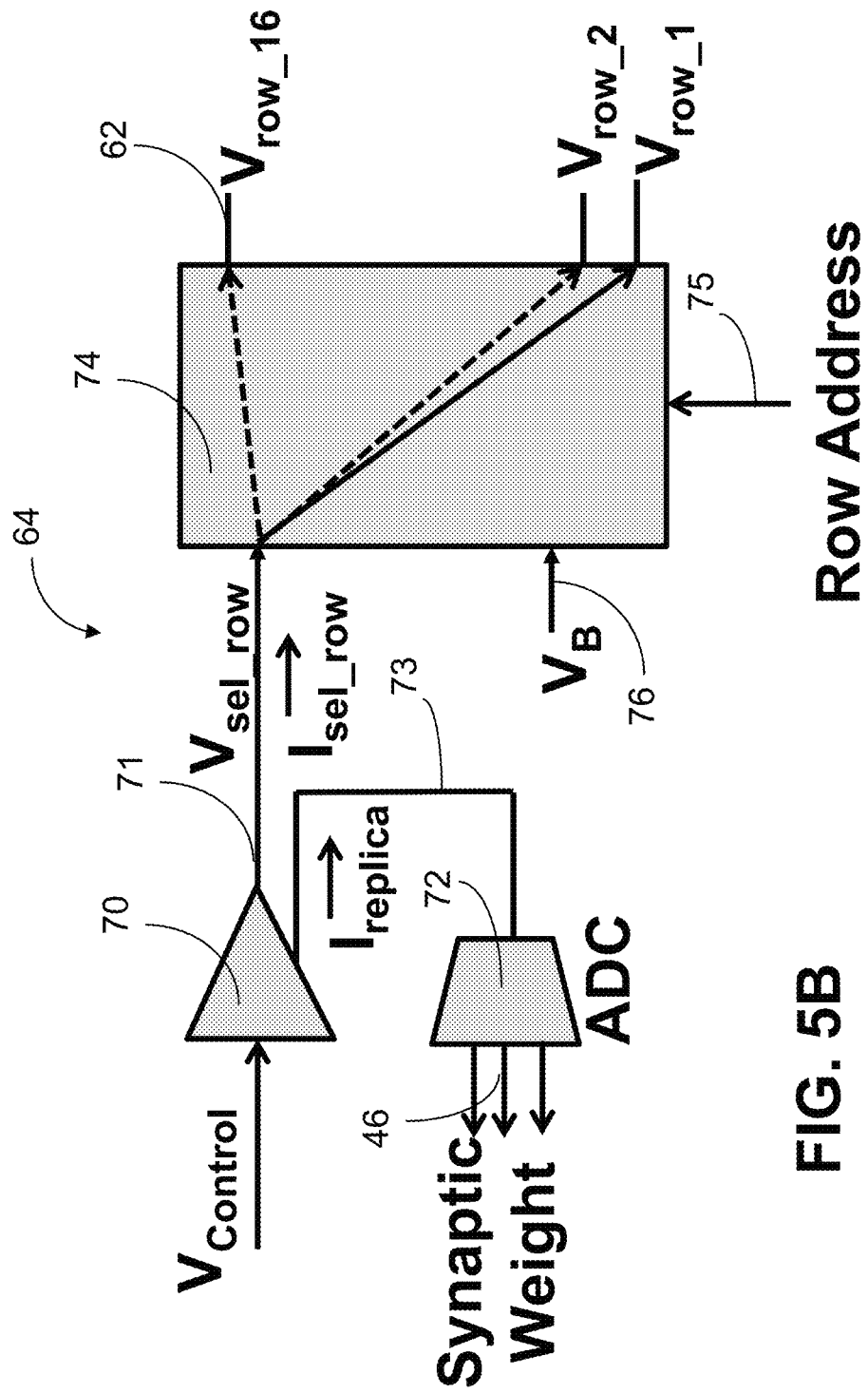
FIG. 5B shows circuitry connected to rows of the memristor array.

FIG. 5B shows a diagram of row circuit 64, which has a buffer amplifier 70, an analog to digital converter (ADC) 72, and a de-multiplexer (DeMUX) 74. A row address is input to the DeMUX 74 to connect the buffer amplifier 70 output Vsel_row 71 to one of the row vias 62 connected to memristor nanowires 60. The other 15 unselected nanowires 60 may be connected to a bias voltage 76.

For reading a memristor value from a memristor 35, the buffer amplifier 70 is used to set a reading voltage on Vsel_row 71. The amplifier 70 has an extra terminal 73 that provides a current equal to that flowing to the memristor. This current, which is proportional to the value stored in the memristor, is digitized by the analog to digital converter 72 to produce a synaptic weight or synaptic conductance value 46, which may be a 3-bit (8-level) code. The synaptic weight or synaptic conductance value 46 is applied to the synapse 24 as shown in FIG. 2.

Figure 5C:
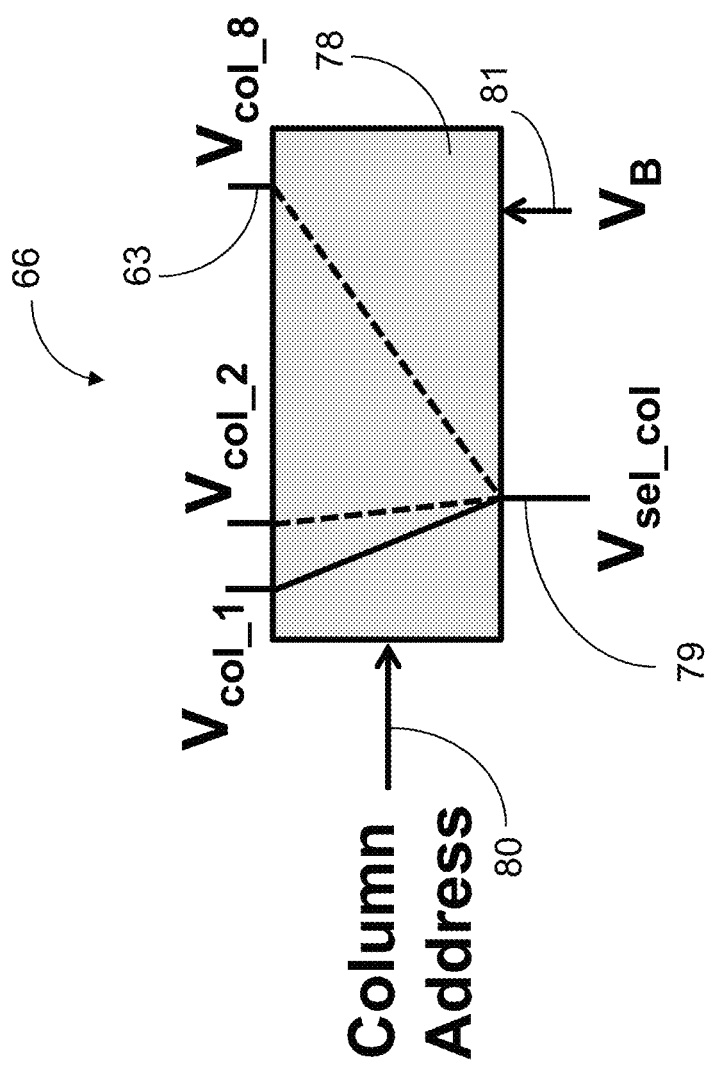
FIG. 5C shows circuitry connected to the columns of the memristor array.
Figure 5D:
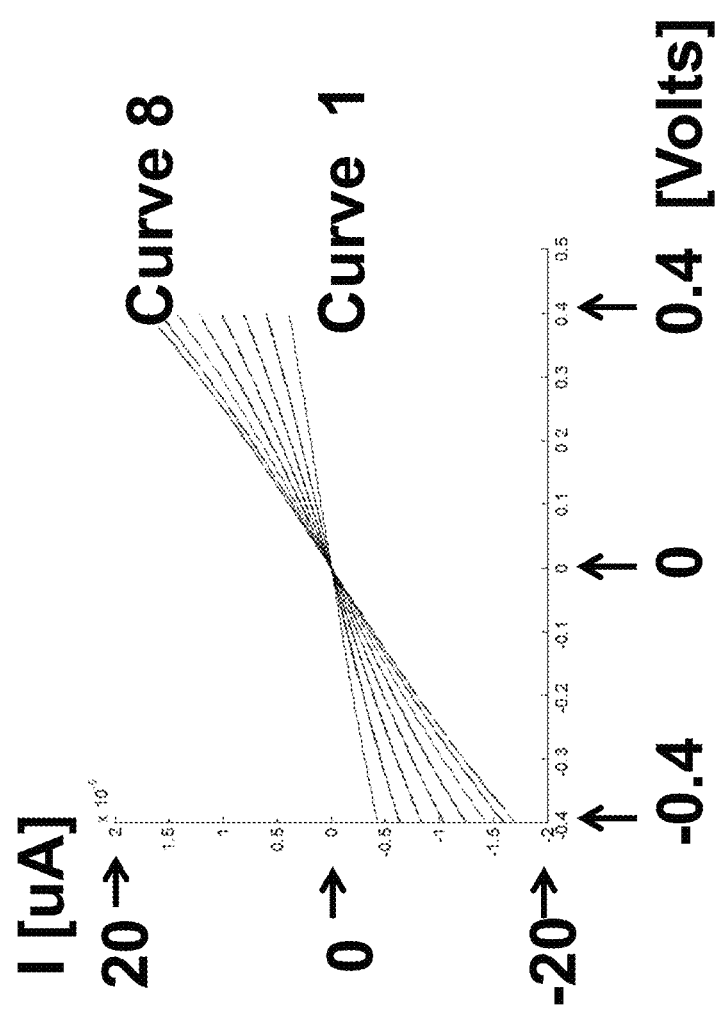
FIG. 5D shows an example of a typical I-V characteristic for a memristor.
Figure 5E:
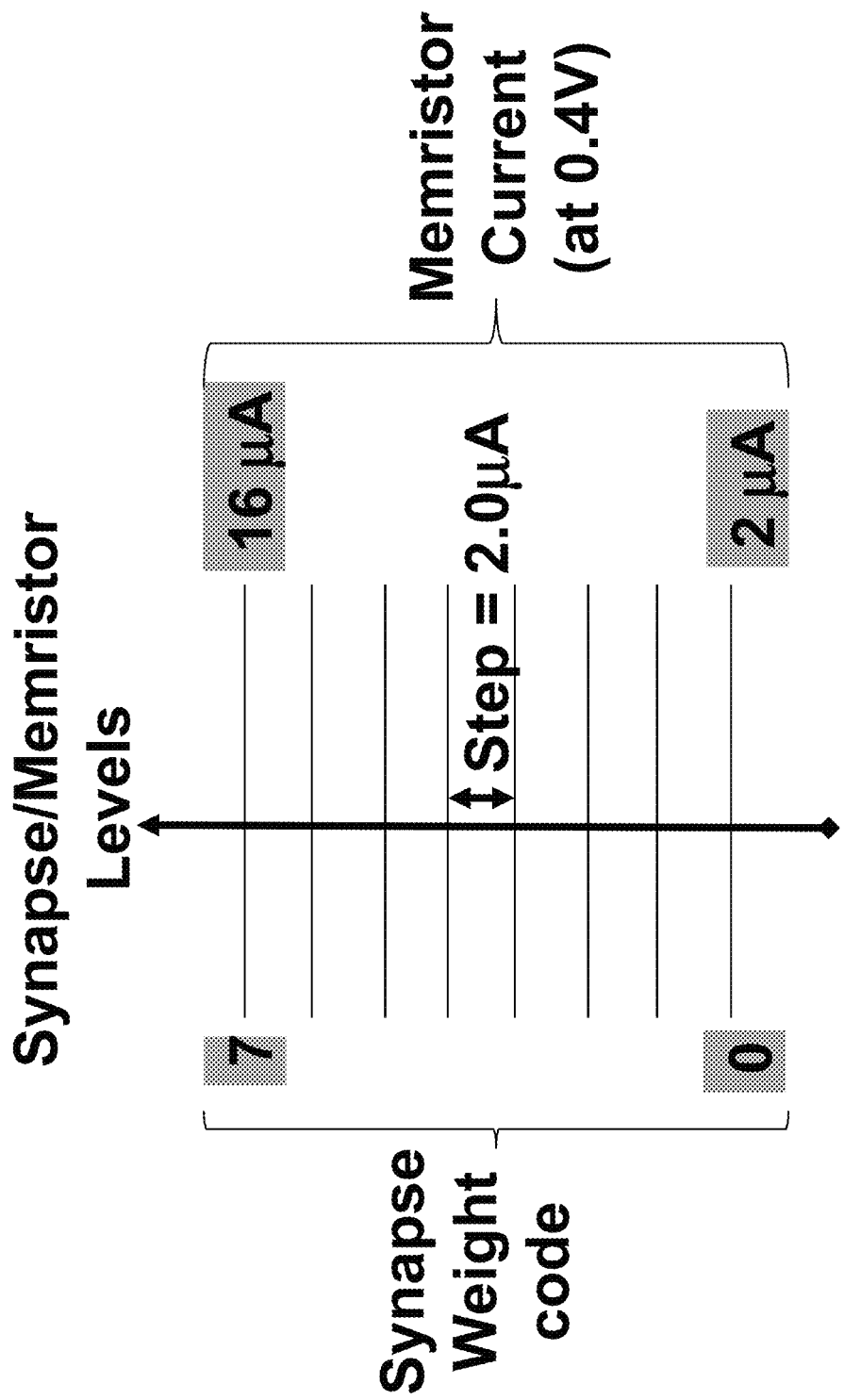
FIG. 5E shows typical values of memristor currents when biased at 0.4V and correspondence to a synapse weight code in accordance with the present disclosure.

FIG. 5C shows a diagram for the column circuit 66, which has a demultiplexer (DeMUX) 78 that connects Vsel_col to one of the column vias 63 connected to memristor nanowires 61, shown in FIG. 5A, in accordance with a column address 80. The other unselected nanowires are connected to other bias voltages, such as bias voltage 81. These bias voltages are used to minimize leakage paths. A typical I-V characteristic of a memristor 35 is shown in FIG. 5D, and typical current levels during a memristor read operation at 0.4V are shown in FIG. 5E.

The output spike signals produced by a neuron circuit 22 in a processing node 12 can be routed to the synapse circuit 24 of a different node 12 by interconnect fabric 38, which is shown in detail in FIGS. 6A, 6B and 6C.

FIG. 6A shows the detail of the interconnect fabric or interconnect circuitry 38 associated with one node 12. The interconnect fabric 38 is composed of conductors or wires 83, uni-directional buffer-based switches 84, bi-directional buffer-based switches 85 and memory 30. The memory 30 stores connectivity data used by the interconnect fabric. In one embodiment this memory is implemented using CMOS technology. The states, ON or OFF, of each of the switches 84 and 85 are stored in memory 30. All the nodes 12 have the same hardware, but the switch states can be programmed independently in each node 12, for each time slot 58 of a STM cycle 56. A unidirectional switch 84 may be implemented by a buffer 84 as shown in FIG. 6B. The buffer 84 can be turned on or off according to a control line 86. The detail of a bi-directional switch 85 is shown in FIG. 6C. This switch is composed of two buffers, but only one of the two buffers may be set ON at a given time, and the state of the bi-directional switch 85 is controlled by two control lines 87. The memory 30 inside the node 12 contains information about the control (ON or OFF) of all of the switches 84 and 85. All the switch states for a node 12 for all the time slots 58 in a STM cycle 56 may be the same for each STM cycle 56. So the memory 30 need only store the switch states of all the time slots of one STM cycle, which is the time required to cycle through N virtual synapses.

The memory 30 stores the interconnect or routing configuration for all the time slots of a STM cycle as shown in FIG. 6D. In one embodiment the memory 30 has 34 columns and N rows per node. The data in a column of the memory 30 is used to generate control signals for a particular switch for all N time slots. The memory 30 is initialized with a user-defined network topology. A neuromorphic compiler can be used to initialize this memory. An example of compiler is described in Reference [5] above, which is incorporated herein by reference.

The reconfigurable neural circuit 10 can be programmed to implement different neural networks. Two simulations are described below. In each simulated case the integrated circuit implements a particular neural network topology.

Figures 7A, 7B:
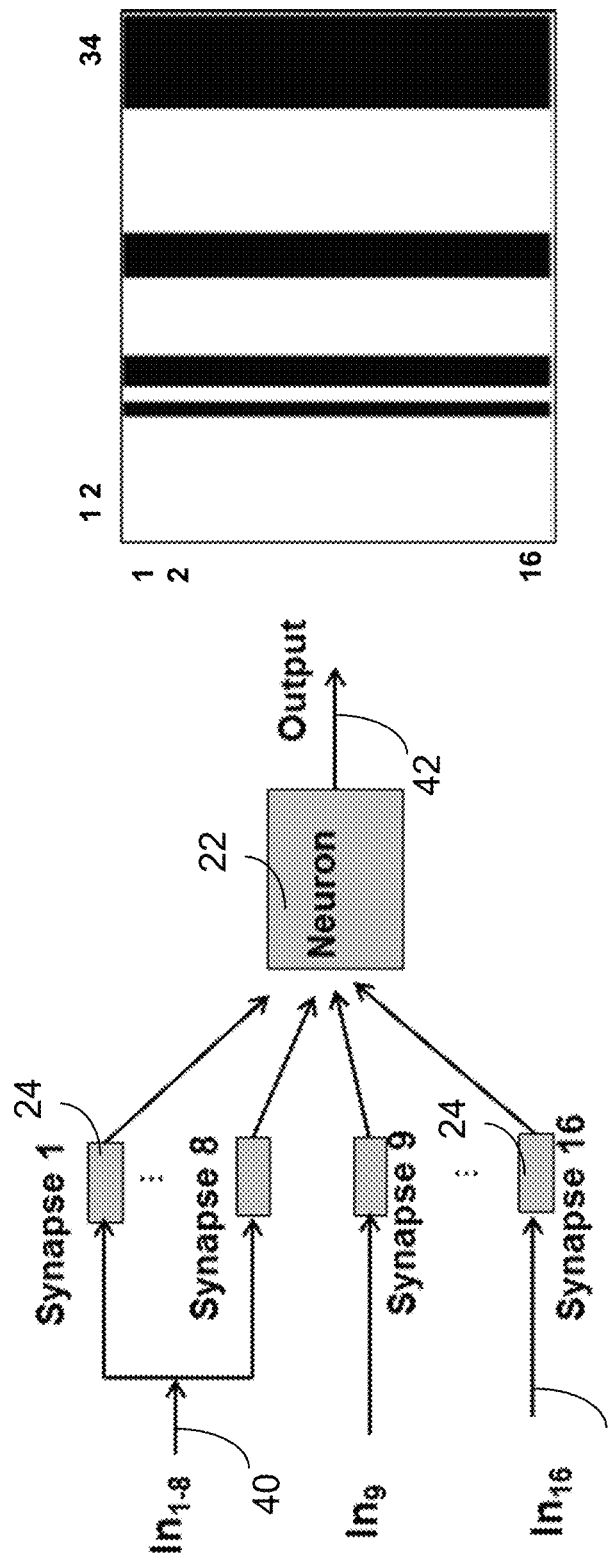
FIG. 7A shows an example for simulation of a neural network with the outputs of a single time shared synapse circuit represented by synapse outputs 1-16 connected to a neuron circuit.
FIG. 7B shows a memory with 16 rows corresponding to time slots and 34 columns corresponding to switches that are set in the interconnect fabric, where black represents an OFF state and white represents an ON state in accordance with the present disclosure.

A neural network in a first simulation, shown in FIG. 7A, is composed of a neuron 22 and 16 synapses 24. The weight of each synapse is internally controlled by a STDP circuit 26. The network of FIG. 7A can distinguish if several of their inputs are correlated to each other.

The simulation that implements the network of FIG. 7A begins by initializing the memory 30 for routing spikes between neurons by setting the switch states in the node as shown in FIG. 7B. The plot of FIG. 7B shows the contents of the memory 30 using the same format as shown in FIG. 6D. FIG. 7B shows the memory as an array of bits. Columns are associated with a particular switch of the node. Rows are associated with a time slot. In the plot of FIG. 7B the size of the memory 30 is 34 rows each with 16 bits. In this example a bit with value of "0" is shown in black and a bit with value of "1" is shown in white.

Figures 8A, 8B:
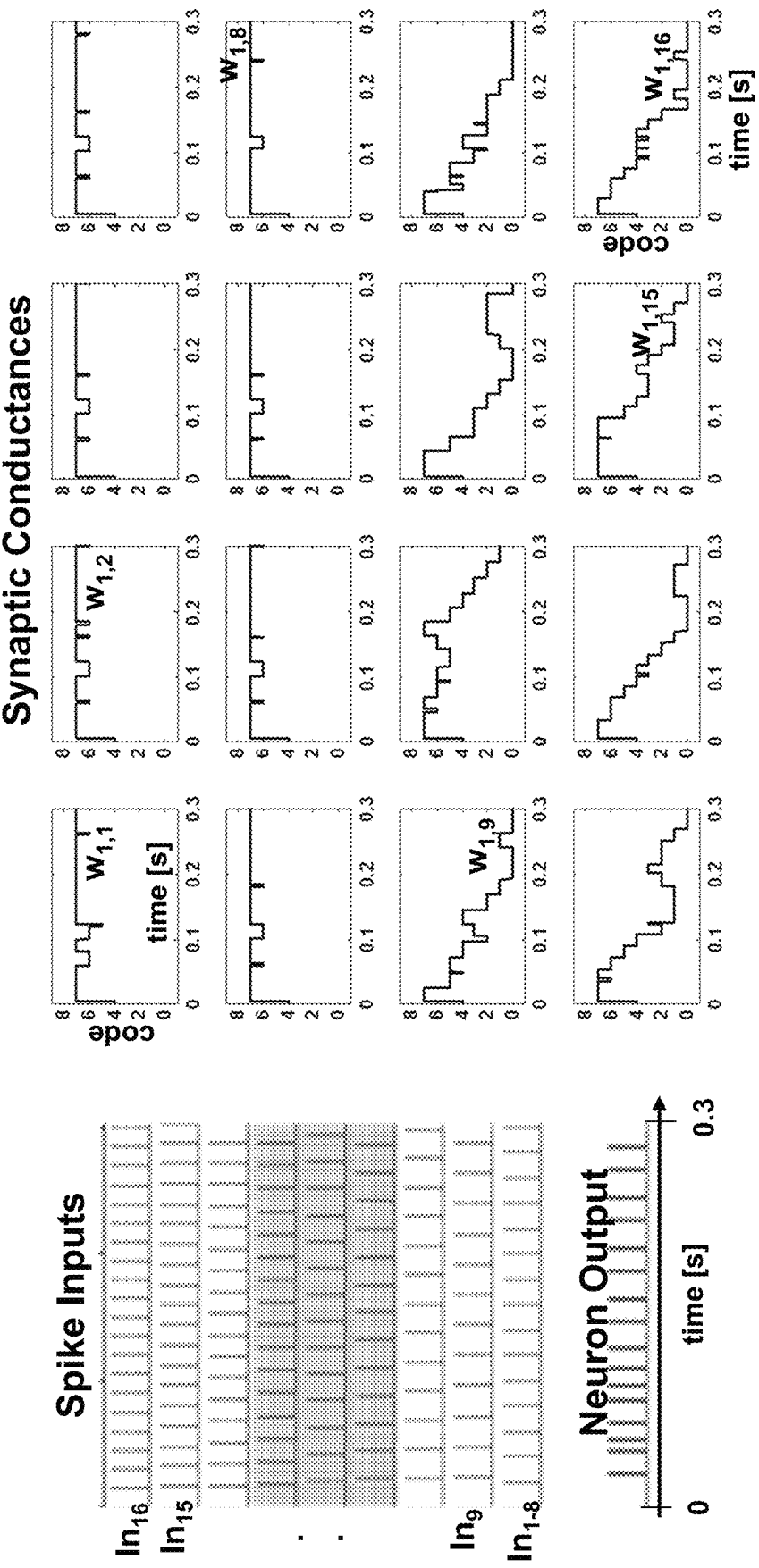
FIG. 8A shows on the top of FIG. 8A the time shared synapse spike inputs to the neuron circuit and on the bottom of FIG. 8A the neuron circuit output.
FIG. 8B shows example synaptic conductance values over time coupled to the single synapse circuit in accordance with the present disclosure.

The top plots of FIG. 8A show the inputs provided to the synapses 24 in the form of spike trains. A set of eight different input spike trains, not correlated to each other, are applied to synapses 9 through 16. One additional spike train signal, shown as $In_{1-8}$ in FIG. 8A is used as a common input to synapses 1 through 8. In this simulation synapses 1-8 receive identical inputs, perfectly correlated to each other. As stated above, the network can be used to determine which inputs are correlated or uncorrelated to each other. The circuit of the invention can implement different neural networks (with different topologies) that could be used for different applications. To illustrate and simulate the operation of the circuit we have implemented, as a first example, a neural network that can be used in the application of distinguishing correlated inputs to uncorrelated inputs. The circuit of the invention can also implement other neural networks for other applications.

The bottom plot of FIG. 8A shows the output produced by the neuron 22 shown in FIG. 7A during the simulation. The presynaptic inputs 40 and the neuron output 42 are used by a STDP circuit 24 to generate updates to the synaptic conductance values. In this simulation there are 16 synaptic conductance weights that are stored in 16 memristors. The time evolution of the 16 synaptic conductance weights, denoted as $w_{1,1}$ to $w_{1,16}$, is shown in FIG. 8B. They are stored in memristors $M_{1,1}$ through $M_{1,16}$ 35 within one node. During a cycle 56, the memristors of a node are accessed cyclically for each time slot 58. Each access operation consists of a memristor read, calculation of a weight increment or decrement by the STDP circuit, and a memristor write to update the synaptic conductance weight in the memristor. The writing is performed only if there is a change different from a zero increment or decrement.

During a 100 μs time slot 58 one memristor 35 of a node 12 is accessed once. During a 1.6 ms STM cycle 56, all 16 memristors 35 of the node 12 are accessed once. The plots of FIG. 8B show the simulation of the weights for 0.3 seconds of operation. In this simulation, there are on average 187 access operations performed on each of the 16 memristors.

The vertical axes of the plots of FIG. 8B represent the code for the synaptic conductance value 46. This code is produced by the ADC 72 shown in FIG. 5B that ranges from 0 to 7 in steps of 1. It can be observed, according to the simulation, that after 0.3 second the synaptic conductance values $w_{1,1}$ to $w_{1,8}$, which are associated with synapses 24 receiving correlated inputs, all tend to a high value. The weights $w_{1,9}$ to $w_{1,16}$, associated with synapses 24 receiving uncorrelated inputs, all tend to a low value, which is the desired behavior.

Figure 9A:
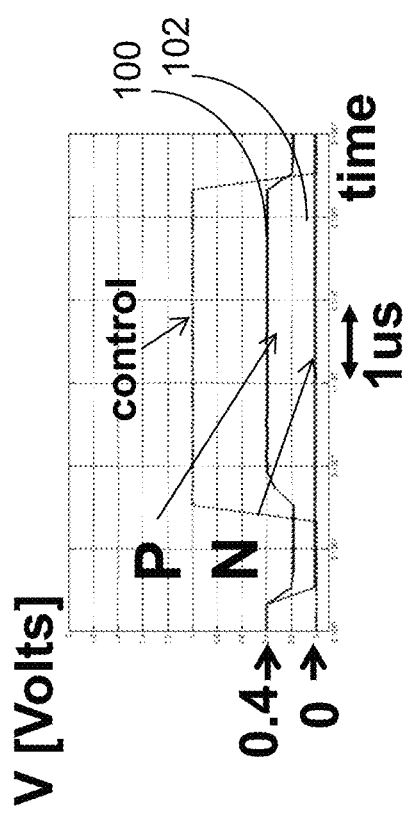
FIG. 9A shows a voltage waveform for a memristor read operation.
Figure 9B:
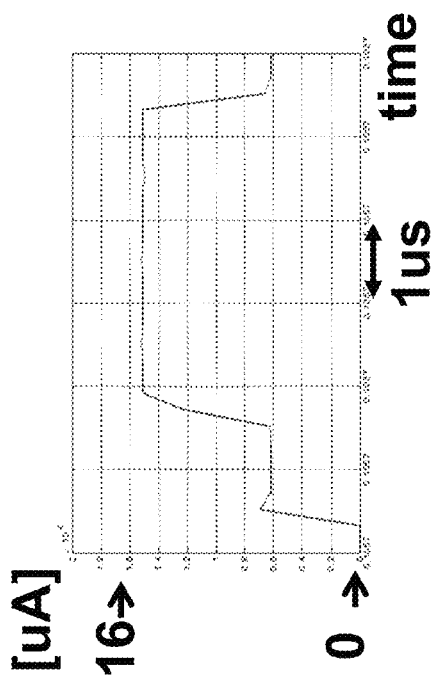
FIG. 9B shows a current waveform for a memristor read operation in accordance with the present disclosure.

The details of a single memristor 35 read operation during this simulation are shown in FIGS. 9A and 9B. The waveform in FIG. 9A labeled as P 100 represents the voltage applied to a positive terminal of the memristor 35 and is 0.4 V in this simulation, however, the voltage can also be programmed to be a different value. The line labeled as N 102 represents the voltage applied to the negative terminal of the memristor 35. It is zero during a read operation. The control signal, shown in FIG. 9A, enables the operation of the ADC circuit 72 to digitize the current of the memristor to one of eight possible synaptic conductance codes 46. In a typical embodiment the read operation lasts 4 μs. The current through the memristor 35 during a read operation is shown in FIG. 9B. In a typical embodiment, during a read operation, the currents range from 2 μA to 16 μA.

Figure 10A:
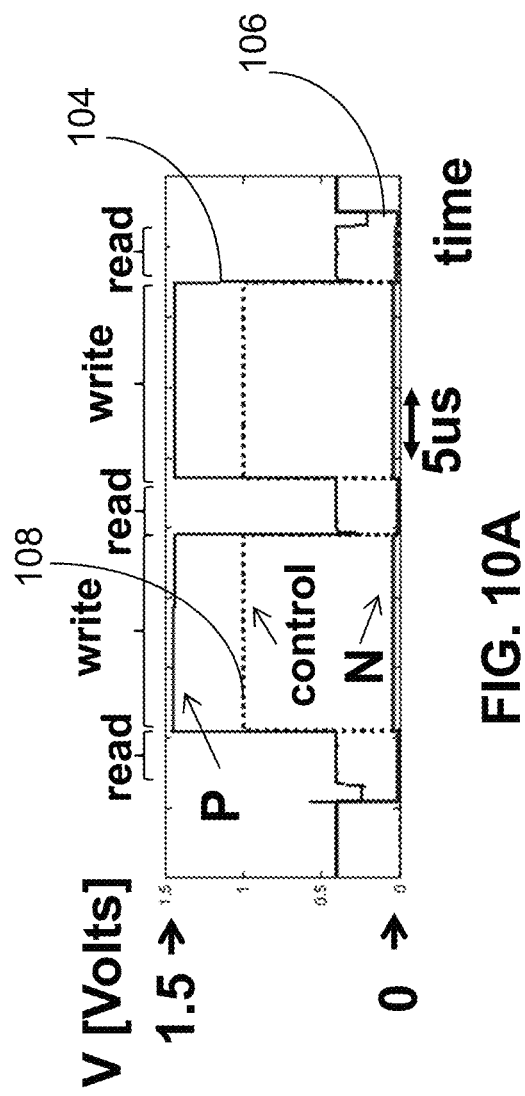
FIG. 10A shows a voltage waveform for a memristor write operation.
Figure 10B:
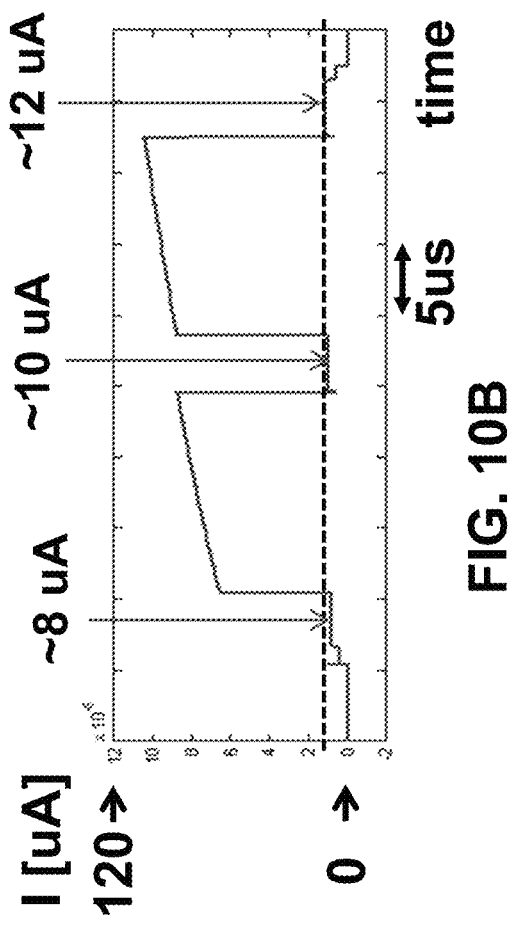
FIG. 10B shows a current waveform for a memristor write operation in accordance with the present disclosure.

The details of a typical write operation during the simulation are shown in FIGS. 10A and 10B. The write operation is used to increment or decrement the value of a memristor 35 by an update value. The STDP 26 calculates the required increase or decrease to the synaptic weight. Then it applies one pulse or a set of pulses in proportion to the magnitude of the change in synaptic conductance to one of the two terminals of the memristors.

For an increment change in synaptic conductance, pulses are applied to the positive terminal of the memristor 35. The key voltages for the write operation are shown in FIG. 10A. The waveform labeled as P 104 represents the voltage applied to the positive terminal of the memristor 35. In this simulation the write voltage used is 1.4 volts, however, the voltage can also be programmed to be a different value. The line labeled as N 106 represents the voltage applied to the negative terminal of the memristor 35. It is approximately zero during a read operation. The dotted line 108 represents a control signal that sets the duration of the write pulse. For writing an increment to a synaptic weight, from 1 to 4 write pulses are applied.

The number of pulses is determined by an on-chip control circuit that reads the memristor current just after each write pulse. The set of pulses is stopped when the target increment value is achieved. In the example of the FIG. 10A the target increment is achieved after two write pulses. The current through the memristor 35 during the writing sequence is shown in FIG. 10B. During each write pulse currents of about 100 μs can flow through the memristor 35. The read currents measured in the 4 μs intervals after each write pulse are in the desired range of 2 μA to 16 μA. For a decrement operation, a similar process occurs when the pulses are applied to the negative terminal of the memristor 35.

The simulation of a reconfigurable neural circuit 10 implementing a more complex network with ten neurons 22 is shown in FIG. 11A. This simulation has an additional layer of 9 neurons 22 located between the inputs 90 and the output neuron 92, which has an output 93. The functional behavior of this network is similar to the simulation described above, in that this network can distinguish correlated inputs from uncorrelated inputs.

Figure 11B:
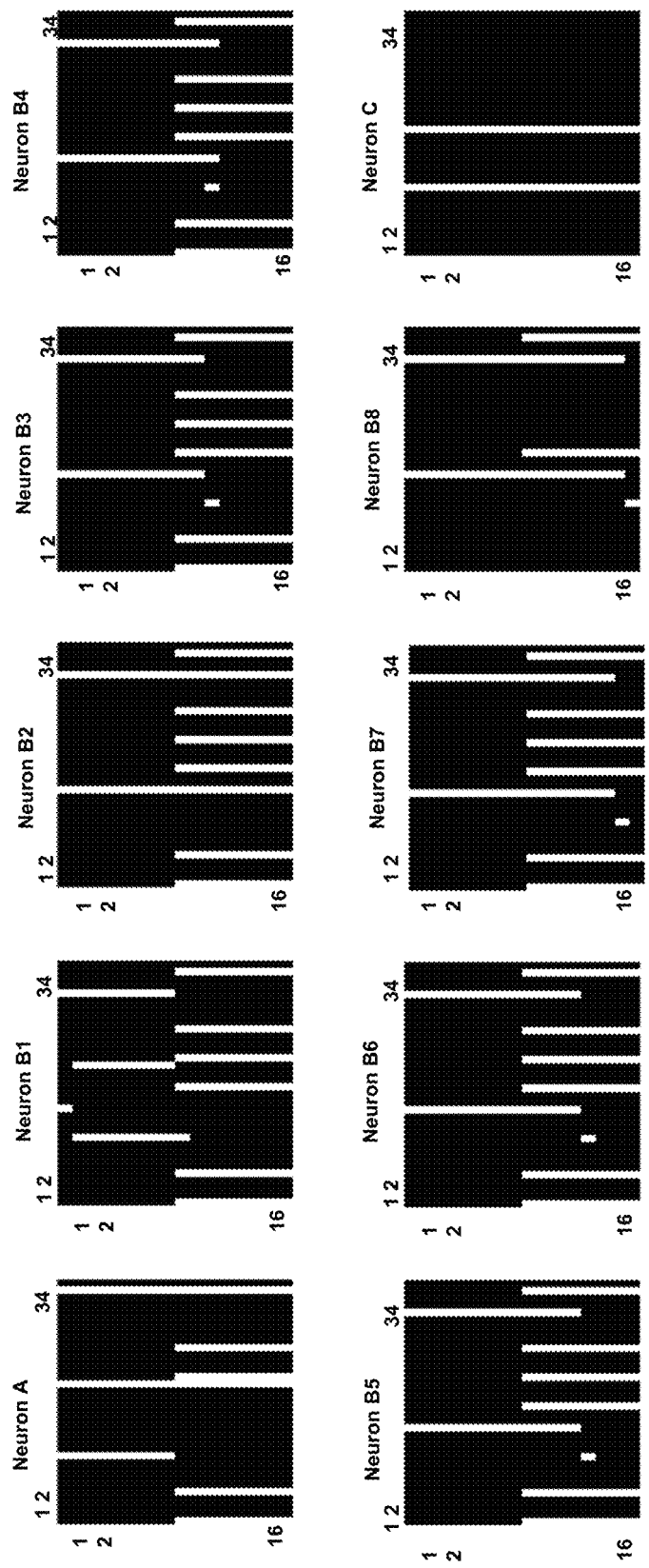
FIG. 11B shows snap shots of switch states stored in memory for the network with 16 rows corresponding to the time slots and 34 columns corresponding to the switches that are set in the interconnect fabric for each neuron type, where black represents an OFF state and white represents an ON state.

The memory 30 is initialized as shown in FIG. 11B. The switch states in each node 12 are set as shown in FIG. 11B and are used to route the spikes between the various neurons in the network during each STM cycle 56. The process is repeated from the beginning after the completion of each STM cycle. The output 93 of the neuron 92 is shown in FIG.

Figure 11D:
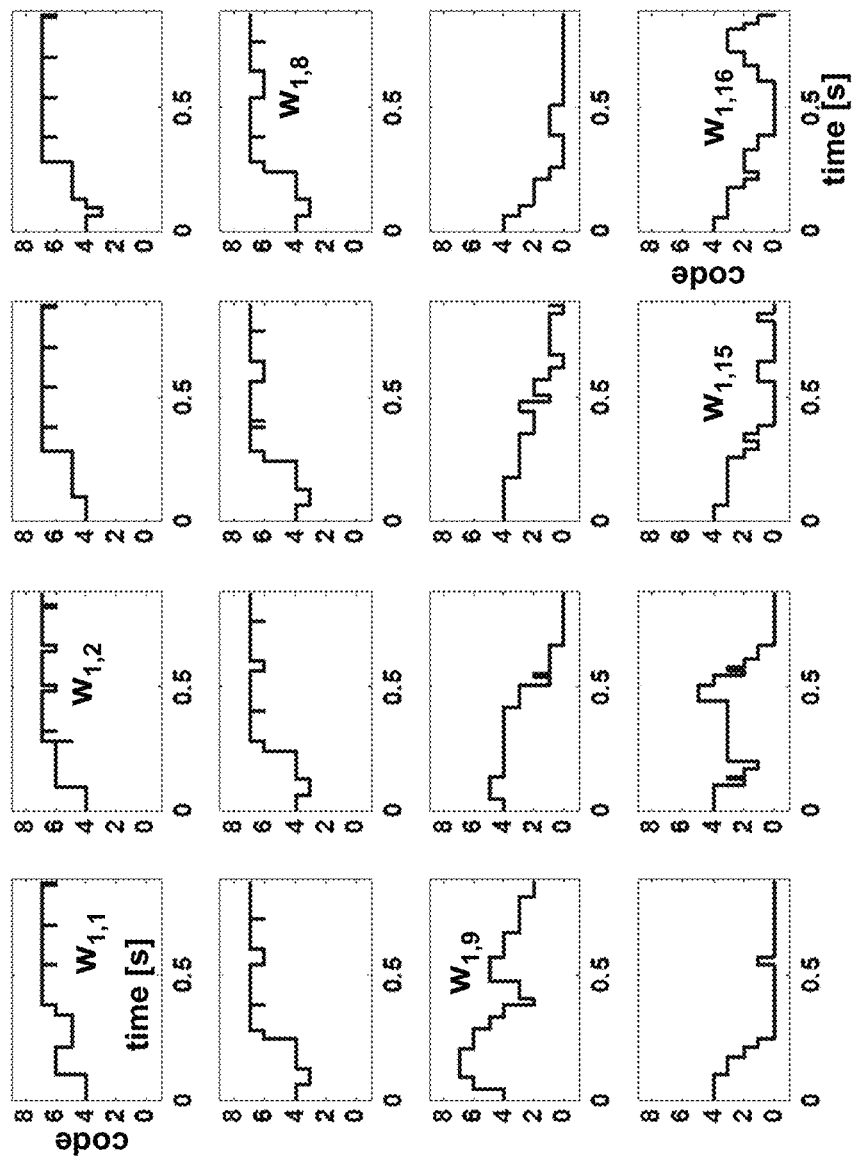
FIG. 11D shows synaptic conductance values over time for the 16 synapses and shows convergence to the correct states in accordance with the present disclosure.

11C. The time evolution of the 16 synaptic weights, denoted as $w_{1,1}$ to $w_{1,16}$ is shown in FIG. 11D. The weights are stored in memristors $M_{1,1}$ to $M_{1,16}$ 35 within a node 12. In one embodiment of the invention these memristors are part of the 8×16 array of memristors shown in FIG. 5A. It can be observed that after approximately 0.8 seconds the weights $w_{1,1}$ to $w_{1,8}$, which are associated with synapses receiving correlated inputs, all tend to a high value. The weights $w_{1,9}$ to $w_{1,16}$, associated with synapses receiving uncorrelated inputs, all tend to a low value, which is the desired behavior.

An integrated circuit implementing a reconfigurable neural circuit 10 was fabricated and tests were conducted. The reconfigurable neural circuit 10 was configured to implement the same network as shown in FIG. 11A, which as described can distinguish if several input signals are correlated to each other.

Figures 12A, 12B, 12C:
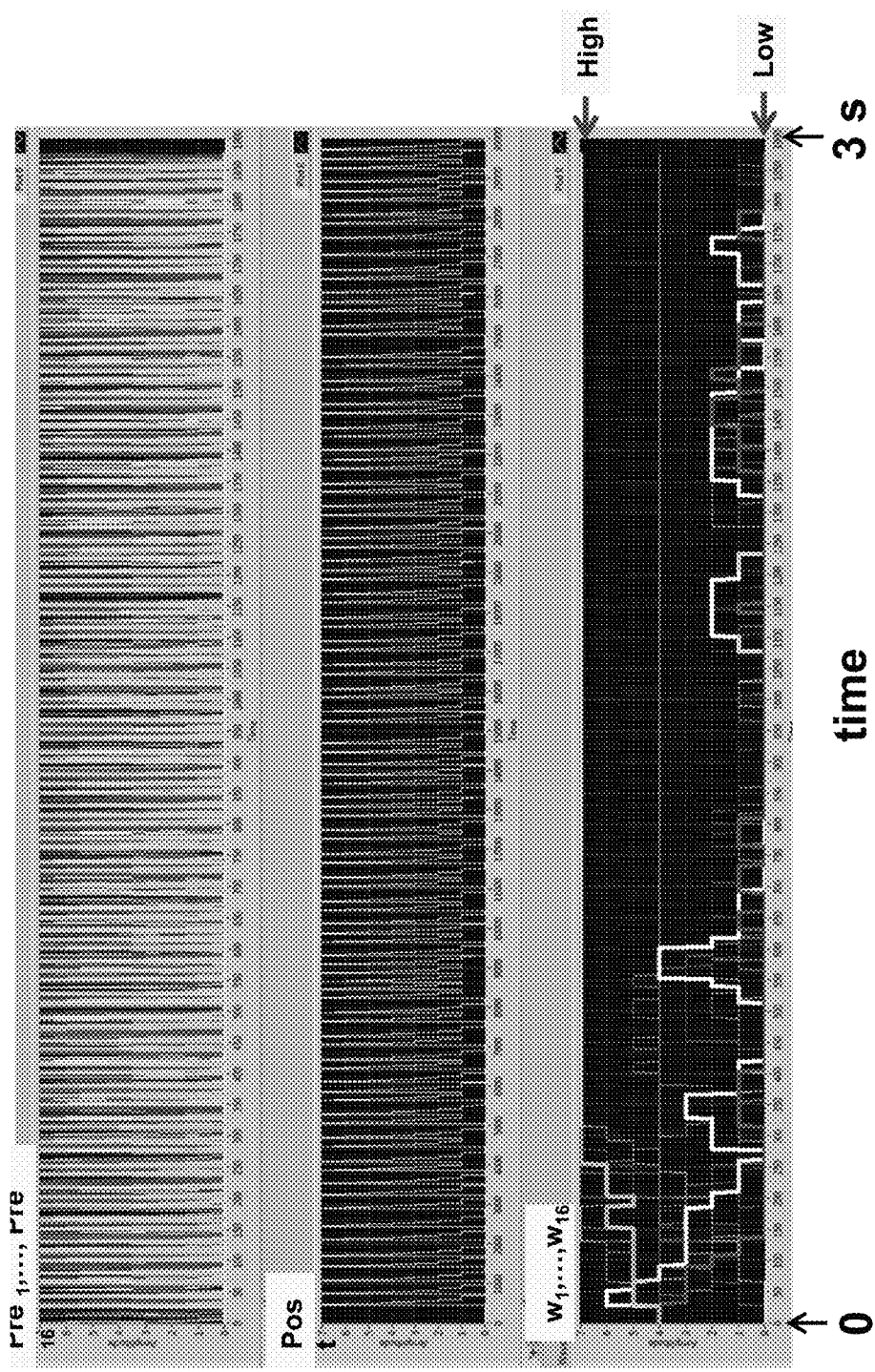
FIG. 12A shows a simulation of presynaptic inputs of the 16 synapses of FIG. 11A.
FIG. 12B shows the postsynaptic spikes produced by the output neuron C of FIG. 11A.
FIG. 12C shows the weights of the 16 synapses of FIG. 11A during a 3 second test in accordance with the present disclosure.

The synaptic weights were stored in memory 28. In the network there are 16 synapses 24 between the input neurons 22 and the output neuron 92. The graph of FIG. 12A shows the presynaptic inputs of those 16 synapses. Eight of the inputs to synapses are the same and therefore correlated to each other. The other eight inputs to other synapses are uncorrelated to each other. The graph of FIG. 12B shows the postsynaptic spike produced by the output neuron 92. The graph of FIG. 12C shows the weights of 16 synapses during a 3 second test. At the end of the test, the weights diverge to either a high value or a low value. The weights reaching a high value correspond to synapses receiving correlated inputs, as desired. The weights reaching a low value correspond to synapses receiving uncorrelated inputs, as desired.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "comprising the step(s) of . . ."

What is claimed is:

1. A reconfigurable neural circuit comprising:
an array comprising a plurality of processing nodes;
wherein each processing node comprises:
one and only one physical neuron, the one and only one physical neuron having an input and having an output;
one and only one physical synapse, the one and only one physical synapse having a presynaptic input, and the one and only one physical synapse having an output coupled to the input of the one and only one physical neuron;
a weight memory for storing N synaptic conductance value or weights, the weight memory having an output coupled to the one and only one physical synapse, wherein N is an integer greater than 1;
one and only one physical spike timing dependent plasticity (STDP), the one and only one physical STDP having an output coupled to an input of the weight memory, a first input coupled to the output of the one and only one physical neuron, and a second input coupled to the presynaptic input; and
interconnect circuitry connected to the presynaptic input and connected to the output of the one and only one physical neuron;
wherein the input of the one and only one physical neuron is only connected to the output of the one and only one physical synapse;
wherein the one and only one physical synapse is time multiplexed to implement N virtual synapses; and
wherein the one and only one physical STDP is time multiplexed to implement N virtual STDPs; and
wherein the interconnect circuitry in each respective processing node in the array is coupled to the interconnect circuitry in each other processing node in the array.

2. The reconfigurable neural circuit of claim 1:
wherein each processing node is adapted to read a respective one of the N synaptic conductance values or weights from the weight memory for each respective time period of N time periods and wherein each respective one of the N synaptic conductance values or weights coupled to the one and only one physical synapse during a respective time period of the N time periods causes the one and only one physical synapse to operate as a respective virtual synapse according to the coupled conductance value or weight during the respective time period; and
wherein each processing node is adapted to update the respective synaptic conductance value or weight read from the weight memory by writing the weight memory in the respective time period according to the output of the one and only one physical spike timing dependent plasticity during the respective time period.

3. The reconfigurable neural circuit of claim 1 wherein:
the neuron comprises an integrate and fire circuit.

4. The reconfigurable neural circuit of claim 1 wherein:
the weight memory comprises a memristor memory, flip flops, a static random access memory or a digital memory.

5. The reconfigurable neural circuit of claim 1:
wherein the interconnect circuitry in each processing node is coupled to the presynaptic input in each other processing node and coupled to the output of the one and only one physical neuron in each other processing node.

6. The reconfigurable neural circuit of claim 1 wherein:
the interconnect circuitry comprises a plurality of switches for changing the interconnections to and from a respective processing node and other processing nodes in the array.

7. The reconfigurable neural circuit of claim 6 wherein:
the plurality of switches comprise a plurality of unidirectional and bi-directional switches.

8. The reconfigurable neural circuit of claim 1 wherein:
the one and only one physical STDP comprises a biologically inspired spike timing dependent plasticity (STDP) learning rule.

9. The reconfigurable neural circuit of claim 1 wherein:
the array comprises a two dimensional array of processing nodes.

10. The reconfigurable neural circuit of claim 1 wherein each processing node further comprises:
a connectivity memory;
wherein the interconnect circuitry in each processing node comprises a plurality of switches;
wherein the connectivity memory stores a plurality of interconnect circuitry routing controls for each respective switch of the plurality of switches; and
wherein the plurality of interconnect circuitry routing controls for a respective switch of the plurality of switches is configured to control the respective switch for each respective time period of N time periods.

11. The reconfigurable neural circuit of claim 10:
wherein the interconnect circuitry routing controls stored in the connectivity memory in each processing node determine whether the output of the one and only one physical neuron in a respective processing node is connected to a respective presynaptic input in another processing node.

12. The reconfigurable neural circuit of claim 10:
wherein the interconnect circuitry in a respective processing node provides connections between the one and only one physical neuron, the one and only one physical synapse, and the one and only one physical STDP circuit in the respective processing node.

13. The reconfigurable neural circuit of claim 10:
wherein the plurality of interconnect circuitry routing controls stored in the connectivity memory in a respective processing node is programmed independently for each respective processing node in the array.

14. The reconfigurable neural circuit of claim 10:
wherein the connectivity memory has a column corresponding to each respective switch in a processing node;
wherein each column has N rows corresponding to the N time periods; and
wherein the interconnect circuitry routing controls in a column for a respective switch comprise N controls for the respective switch, wherein each of the N controls is ON or OFF.

15. The reconfigurable neural circuit of claim 1:
wherein during operation, time is divided into synaptic time multiplexing cycles;
wherein each cycle comprises N time slots; and
wherein during each of the N time slots the weight memory outputs a respective one of the N synaptic conductance value or weights, the one and only one physical synapse implements respective one of the N virtual synapses and outputs an output of the respective one of the N virtual synapses to the one and only one physical neuron circuit, and the one and only one physical STDP implements a respective one of the N virtual STDPs based on the output of the one and only one physical neuron during the time slot and the presynaptic input during the time slot, and updates the respective one of the N synaptic conductance value or weights during the time slot.

16. The reconfigurable neural circuit of claim 15:
wherein each processing node has a connectivity memory for controlling the interconnect circuitry in the processing node; and
wherein during each time slot the interconnect circuitry in a respective processing node is configured according to controls read from the connectivity memory in the respective processing node.

17. A method for providing a reconfigurable neural circuit comprising:
providing an array comprising a plurality of processing nodes;
wherein each processing node comprises:
one and only one physical neuron, the one and only one physical neuron having an input and having an output;
one and only one physical synapse, the one and only one physical synapse having a presynaptic input, and the one and only one physical synapse having an output coupled to the input of the one and only one physical neuron;
a weight memory for storing N synaptic conductance value or weights, the weight memory having an output coupled to the one and only one physical synapse, wherein N is an integer greater than 1;
one and only one physical spike timing dependent plasticity (STDP), the one and only one physical STDP having an output coupled to an input of the weight memory, a first input coupled to the output of the one and only one physical neuron, and a second input coupled to the presynaptic input; and
interconnect circuitry connected to the presynaptic input and connected to the output of the one and only one physical neuron;
wherein the input of the one and only one physical neuron is only connected to the output of the one and only one physical synapse;
wherein the one and only one physical synapse is time multiplexed to implement N virtual synapses; and
wherein the one and only one physical STDP is time multiplexed to implement N virtual STDPs; and
wherein the interconnect circuitry in each respective processing node in the array is coupled to the interconnect circuitry in each other processing node in the array.

18. The method of claim 17:
reading a respective one of the N synaptic conductance values or weights from the weight memory for each respective time period of N time periods and wherein each respective one of the N synaptic conductance values or weights coupled to the one and only one physical synapse during a respective time period of the N time periods causes the one and only one physical synapse circuit to operate as a respective virtual synapse according to the coupled conductance value or weight during the respective time period; and
updating the respective synaptic conductance value or weight read from the weight memory by writing the weight memory in the respective time period according to the output of the one and only one physical spike timing dependent plasticity during the respective time period.

19. The method of claim 17 wherein:
the neuron comprises an integrate and fire circuit.

20. The method of claim 17 wherein:
the weight memory comprises a memristor memory, flip flops, a static random access memory or a digital memory.

21. The method of claim 17:
wherein the interconnect circuitry in each processing node is coupled to the presynaptic input in each other processing node and coupled to the output of the one and only one physical neuron in each other processing node.

22. The method of claim 17 wherein:
the interconnect circuitry comprises a plurality of switches for changing the interconnections to and from a respective processing node and other processing nodes in the array.

23. The method of claim 22 wherein:
the plurality of switches comprise a plurality of uni-directional and bi-directional switches.

24. The method of claim 17 wherein:
the STDP comprises a biologically inspired spike timing dependent plasticity (STDP) learning rule.

25. The method of claim 17 wherein:
providing the array comprises providing a two dimensional array of processing nodes.

26. The method of claim 17:
wherein each processing node further comprises:
a connectivity memory;
wherein the interconnect circuitry in each processing node comprises a plurality of switches; and
storing in the connectivity memory a plurality of interconnect circuitry routing controls for each respective switch of the plurality of switches; and
configuring the plurality of interconnect circuitry routing controls for a respective switch of the plurality of switches to control the respective switch for each respective time period of N time periods.

27. The method of claim 26:
wherein the interconnect circuitry routing controls stored in the connectivity memory in each processing node determine whether the output of the one and only one physical neuron in a respective processing node is connected to a respective presynaptic input in another processing node.

28. The method of claim 26:
wherein the interconnect circuitry in a respective processing node provides connections between the one and only one physical neuron, the one and only one physical synapse, and the one and only one physical STDP circuit in the respective processing node.

29. The method of claim 26 further comprising:
programming the plurality of interconnect circuitry routing controls stored in the connectivity memory in each respective processing node;
wherein the programming is independent for each respective processing node in the array.

30. The method of claim 26:
wherein the connectivity memory has a column corresponding to each respective switch in a processing node;
wherein each column has N rows corresponding to the N time periods; and
wherein the interconnect circuitry routing controls in a column for a respective switch comprise N controls for the respective switch, wherein each of the N controls is ON or OFF.

31. The method of claim 17:
wherein during operation, time is divided into synaptic time multiplexing cycles;
wherein each cycle comprises N time slots; and
wherein during each of the N time slots the weight memory outputs a respective one of the N synaptic conductance value or weights, the one and only one physical synapse implements a respective one of the N virtual synapses and outputs an output of the respective one of the N virtual synapses to the one and only one physical neuron, and the one and only one physical STDP implements a respective one of the N virtual STDPs based on the output of the one and only one physical neuron during the time slot and the presynaptic input during the time slot, and updates the respective one of the N synaptic conductance value or weights during the time slot.

32. The method of claim 31:
wherein each processing node has a connectivity memory for controlling the interconnect circuitry in the processing node; and
wherein during each time slot the interconnect circuitry in a respective processing node is configured according to controls read from the connectivity memory in the respective processing node.

\* \* \* \* \*